United States Patent [19]

Worbois et al.

[11] 4,125,292
[45] Nov. 14, 1978

[54] CONTROL VALVE DEVICE WITH SERVICE AND EMERGENCY LIMITING VALVES

[75] Inventors: Robert J. Worbois, N. Huntingdon; Richard F. Balukin, Penn Hills, both of Pa.

[73] Assignee: Westinghouse Air Brake Company, Wilmerding, Pa.

[21] Appl. No.: 840,888

[22] Filed: Oct. 11, 1977

[51] Int. Cl.² .............................................. B60T 15/52
[52] U.S. Cl. ........................................ 303/36; 303/74
[58] Field of Search ....................... 303/28, 36, 37, 43, 303/69, 74, 35

[56] References Cited

U.S. PATENT DOCUMENTS

| | | | |
|---|---|---|---|
| 2,958,561 | 11/1960 | May | 303/35 |
| 4,033,632 | 7/1977 | Wilson | 303/36 |

Primary Examiner—Trygve M. Blix
Assistant Examiner—Reinhard J. Eisenzopf
Attorney, Agent, or Firm—W. F. Poore; R. W. McIntire, Jr.

[57] ABSTRACT

A brake control valve device, for railway vehicles, embodies an adjustable service brake cylinder limiting valve that may provide any chosen brake cylinder pressure and also an adjustable emergency brake cylinder limiting valve that may provide any selected higher brake cylinder pressure when the control valve device is conditioned for effecting either a direct release of the brakes or a graduated release of the brakes accordingly as a removable selector valve cover member is secured to a ported face formed on the exterior surface of the control valve device in either a direct release or a graduated release position with respect to this ported face.

35 Claims, 5 Drawing Figures

4,125,292

CONTROL VALVE DEVICE WITH SERVICE AND EMERGENCY LIMITING VALVES

BACKGROUND OF THE INVENTION

In the copending patent application of Richard L. Wilson, Ser. No. 734,393, filed Oct. 21, 1976, now U.S. Pat. No. 4,033,632, there is shown and described a brake control valve device for railway vehicles wherein fluid under pressure is supplied from an auxiliary reservoir to a brake cylinder when a service brake application is effected and from both this auxiliary reservoir and also an emergency reservoir to the brake cylinder when an emergency brake application is effected to thereby provide a greater braking force when an emergency brake application is in effect.

In actual practice, the brake control valve device disclosed in the above-mentioned copending application of Richard L. Wilson may be installed on railway vehicles of various sizes that accordingly require different degrees of brake cylinder pressure in order that they are properly braked. Therefore, it is apparent that it would be desirable to provide such a brake control valve device with means so adjustable as to provide a braking force that would properly brake the vehicle in accordance with its size.

Accordingly, it is the general purpose of this invention to provide a railway vehicle brake control valve device with novel adjustable means whereby any selected brake cylinder pressure will be obtained when a service brake application is effected and any selected higher brake cylinder will be obtained during an emergency application.

SUMMARY OF THE INVENTION

According to the present invention, a service valve portion of a railway vehicle brake control valve device embodies therein an exhaust valve that has a lost-motion connection with a supply valve which, when a service brake application is effected, is moved to its seated position by the combined force of brake cylinder pressure and a spring, and, when an emergency application is effected, is moved to its seated position solely by brake cylinder pressure since the spring is rendered ineffective upon effecting an emergency application. Since the supply valve is closed solely by brake cylinder pressure when an emergency application is effected, a higher pressure is obtained in the brake cylinder when effecting an emergency application before the supply valve is closed than is the case when a service brake application is effected.

DESCRIPTION — FIGS. 1, 2, 3 AND 4

Figure 1:
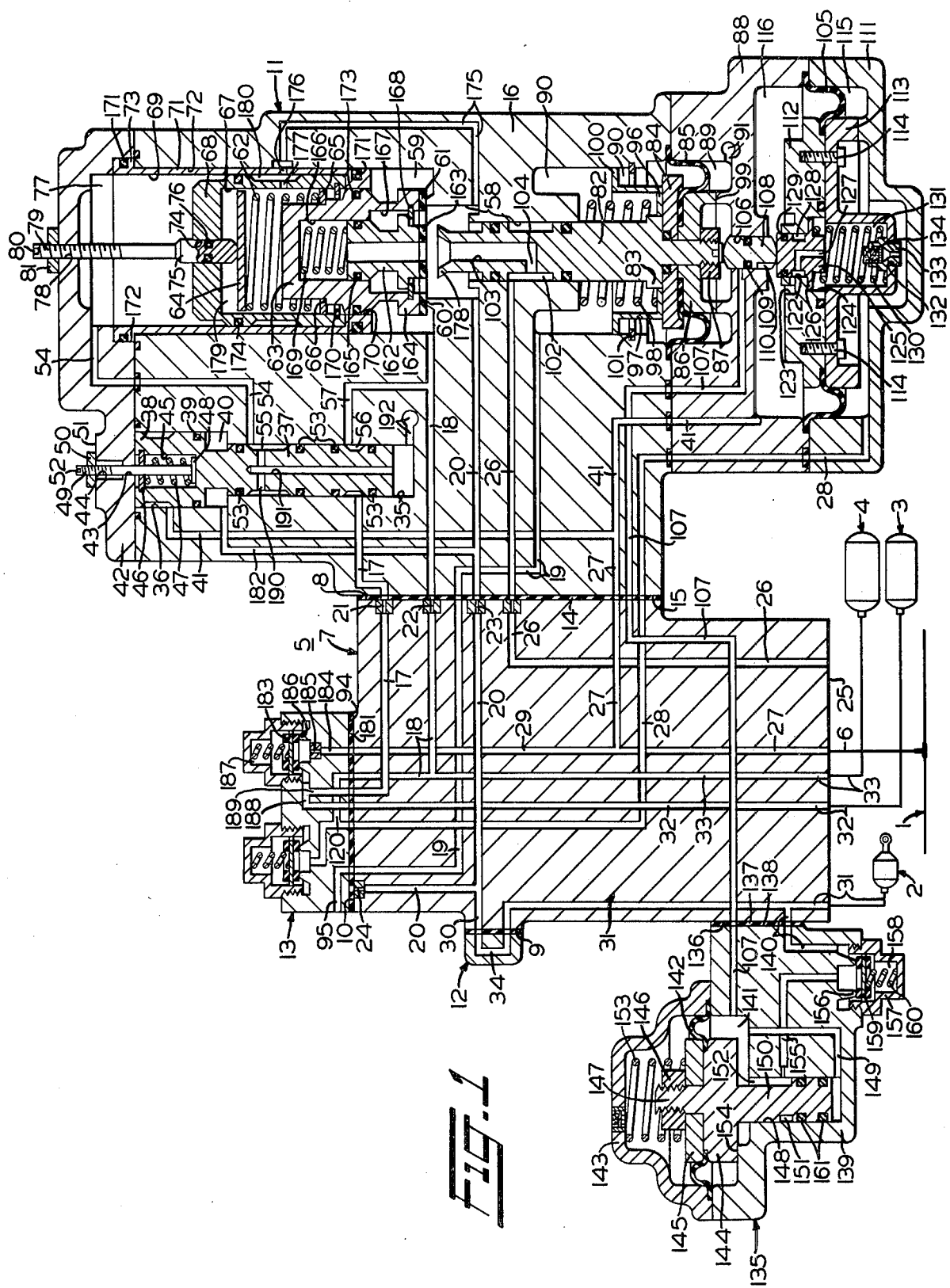
FIG. 1 is a diagrmmatic view of a railway vehicle fluid pressure brake control apparatus embodying the invention.

Referring to FIG. 1 of the drawings, a railway vehicle brake control apparatus embodying the invention comprises a brake pipe 1 that extends from end to end of the vehicle, a brake cylinder 2, a pair of fluid pressure storage reservoirs 3 and 4, and a brake control valve device 5 connected to the brake pipe 1 by a branch pipe 6 and controlled by variations in pressure therein, to effect the supply of fluid under pressure to and from the brake cylinder 2.

The brake control valve device 5 may comprise a pipe bracket 7 having thereon three gasket faces 8, 9, and 10, a service or triple valve device or portion 11, a blanking pad 12, and a removable graduated or direct release valve 13.

As shown in FIG. 1 of the drawings, the service valve device 11 is secured by any suitable means (not shown) to the gasket face 8 of the pipe bracket 7, there being a ported gasket 14 disposed between the gasket face 8 on the pipe bracket 7 and a gasket face 15 formed on the left-hand side of a casing section 16 of the service valve device 11.

Extending from the vertical gasket face 8 on the pipe bracket 7 through this bracket and opening at the horizontal gasket face 10 on this bracket are four ports and passageways 17, 18, 19 and 20. Chokes 21, 22 and 23 are disposed respectively in that end of the passageways 17, 18, 19 and 20 that open at the vertical gasket face 8 on the pipe bracket 7, and a choke 24 is disposed in that end of the passageway 20 that opens at the horizontal gasket face 10. The size of these chokes control the rate of flow of fluid under pressure through the respective passageway.

Extending from the vertical gasket face 8 through the pipe bracket 7 and opening at a flat surface 25 on the lower side of this bracket is an exhaust passageway 26.

Furthermore, extending from the vertical gasket face 8 through the pipe bracket 7 are two passageways 27 and 28. The passageway 28 opens at the vertical gasket face 8 and the horizontal gasket face 10 on the pipe bracket 7, and passageway 27 opens at this vertical gasket face 8 and the flat surface 25 on the bottom of this pipe bracket 7.

As shown in FIG. 1, the branch pipe 6 is connected to that end of the passageway 27 that opens at the flat surface 25, and opening into this passageway 27 intermediate the ends thereof is one end of a passageway 29. The passageway 29 extends through the bracket 7 and opens at its other end at the horizontal gasket face 10.

Moreover, as shown in FIG. 1, the pipe bracket 7 is further provided with four additional passageways 30, 31, 32 and 33.

The passageway 30 opens at one end into the passageway 20 intermediate the ends of passageway 20 and at its opposite end at the gasket face 9 on the pipe bracket 7.

The blanking pad 12 is secured to the gasket face 9 by any suitable means (not shown) and is provided with a passageway 34 that at one end registers with that end of the passageway 30 that opens at this gasket face 9 and at its opposite end registers with that end of the passageway 31 that also opens at this gasket face 9. The opposite end of the passageway 31 is connected by a correspondingly numbered pipe to the brake cylinder 2. The passageways 32 and 33 open at their upper end at the horizontal gasket face 10 and at their lower end are connected respectively by correspondingly numbered pipes to the hereinbefore-mentioned reservoirs 3 and 4.

The gasket face 15 formed on the left-hand side of the casing section 16 of the service valve device 11 corresponds to the gasket face 8 on the pipe bracket 7 in that opening at the surface of this gasket face 15 are the same number of ports as open at the surface of the gasket face 8, these ports being identically arranged therein and opening from corresponding passageways in the casing section 16 so that when the ported gasket 14 is placed between these two gasket faces and the casing section 16 is rigidly secured to the pipe bracket 7 by bolts or other suitable means (not shown), the passageways 17, 18, 19, 20, 26, 27, and 28 in the pipe bracket 7 extend into corresponding passageways in the casing section 16.

The passageway 17 extends through the casing section 16 and opens at the wall surface of a bottomed bore 35 that is coaxial with a counterbore 36 in this casing section 16.

Slidably mounted in the bottomed bore 35 is a spool-type emergency valve 37 that has formed integral therewith at its upper end an actuating piston 38 which is slidably mounted in the counterbore 36.

The actuating piston 38 is provided with a peripheral annular groove in which is disposed an O-ring seal 39 that forms a seal with the wall surface of the counterbore 36 to prevent leakage of fluid under pressure between the periphery of the piston 38 and the wall of the counterbore 36 from a chamber 40 below this piston 38 to a passageway 41 that at one end opens at the wall surface of the counterbore 36.

The upper end of the counterbore 36 is closed by a top cover member 42 that is secured to the upper end of the casing section 16 by any suitable means (not shown), and is provided with a smooth bore 43 and a counterbore 44 that are coaxial with the counterbore 36. The piston 38 is provided with a bottomed bore 45 that is also coaxial with the counterbore 36 and has a groove formed in its wall surface near its upper end in which groove is inserted a snap ring 46. This snap ring 46 constitutes a spring seat for one end of a spring 47 that at its other end rests on a second spring seat 48 that is integral with one end of an adjusting screw 49. This adjusting screw 49 extends through the spring 47, snap ring 46, bore 43 and counterbore 44 and receives on its outer threaded end a lock nut 50, the lower side of which abuts a flat surface 51 formed on the upper side of the cover member 42.

The upper end of the adjusting screw 49 is provided with a screwdriver slot 52. By inserting the end of a screwdriver into the slot 52 and then rotating the screwdriver in one direction or in an opposite direction relative to the nut 50, after it is backed off from surface 51, the tension of the spring 47 may be increased or decreased, as desired, to determine at what brake pipe pressure the emergency valve 37 is moved downward to a lower or second position.

In the absence of fluid under pressure in passageway 41, which is connected to the brake pipe 1 in a manner hereinafter described, the spring 47 is effective to bias the emergency valve 37 to its upper position in which it is shown in FIG. 1. In this upper position of emergency valve 37, the upper end of the actuating piston 38 abuts the cover member 42 and a first O-ring seal 53 disposed in a first peripheral annular groove provided on the emergency valve 37 forms a seal with the wall surface of the bottomed bore 35 to close communication between the chamber 40 and one end of a passageway 54 that opens at the wall surface of this bottomed bore 35 adjacent the upper end thereof.

The emergency valve 37 is further provided with two spaced-apart elongated peripheral annular grooves 55 and 56 and three other peripheral annular grooves in each of which three grooves is disposed an O-ring seal 53 that forms a seal with the wall surface of the bottomed bore 35. These O-ring seals prevent leakage of fluid under pressure from each of the elongated peripheral annular grooves 55 and 56 to the other and also from these grooves to the respective opposite ends of the bottomed bore 35, the upper end of which opens into the chamber 40.

While the piston 38 and emergency valve 37 are biased by the spring 47 to the position shown in FIG. 1, the groove 56 on this emergency valve 37 establishes a communication between that end of the passageway 17 that opens at the wall surface of the bottomed bore 35 and one end of a passageway 57 that opens at the wall surface of this bottomed bore 35 above the one end of the passageway 17. This passageway 57 extends through the casing section 16 and at its other end opens into the passageway 18 in the casing section 16 intermediate the ends of this passageway 18.

As shown in FIG. 1, the casing section 16 of the service valve device 11 is provided with a stepped bore 58 which opens at its lower end at the lower end of the casing section 16 and opens at its upper end into a chamber 59 formed by the cooperative relationship of the casing section 16 and the top cover member 42. At the upper end of the bore 58 there is formed an annular valve seat 60 against which is normally biased an annular resilient flat disc-type supply valve 61 by a spring 62 interposed between a piston member 63 to which this valve 61 is bonded and an annular adjustable spring seat 64, it being noted from FIG. 1 that an annular spring seat 65 supports the lower end of the spring 62 and normally rests on a shoulder 66 formed on the piston member 63.

The annular spring seats 64 and 65, with the spring 62 interposed therebetween, are disposed in a counterbore 67 provided therefor in a piston element 68 that in turn is slidably mounted in a counterbore 69 which is coaxial with a bore 70 in a bushing 71. The piston member 63 is slidably mounted in the bore 70 of the bushing 71 which is disposed in a counterbore 72 provided therefor in the casing section 16 and has integral therewith at its upper end an out-turned flange 73 that is clamped between the upper end of the casing section 16 and the top cover member 42.

As shown in FIG. 1, the piston element 68 is provided with a bore 74 that is coaxial with the hereinbefore-mentioned counterbore 67 in this piston element 68. Slidably mounted in this bore 74 is a pin 75, the lower end of which pin abuts the upper side of the adjustable spring seat 64. Intermediate its ends, this pin 75 is provided with a peripheral annular groove in which is disposed an O-ring seal 76 that forms a seal with the wall surface of the bore 74 to prevent leakage of fluid under pressure between the counterbore 67 in the piston element 68 and the counterbore 69 that at its upper end opens into a chamber 77 in the top cover member 42 into which chamber 77 opens the other end of the hereinbefore-mentioned passageway 54.

The top cover member 42 is provided with a screw-threaded bore 78 for receiving an adjusting screw 79, the lower end of which abuts the upper end of the pin 75, as shown in FIG. 1.

The upper end of the adjusting screw 79 is provided with a screwdriver slot 80. By inserting the end of a screwdriver into the slot 80 and then rotating the screwdriver in one direction or in an opposite direction relative to the top cover member 42, the pin 75 can be shifted upward or downward to, via the annular spring seat 64, vary the tension of the spring 62 and therefore the force with which this spring 62 biases the supply valve 61 against its seat 60.

Subsequent to adjusting the tension of the spring 62 by means of the adjusting screw 79, this screw can be locked in its adjusted position by means of a lock nut 81.

Opening into the chamber 59 is one end of the hereinbefore-mentioned passageway 18 that extends through the casing section 16 and pipe bracket 7 and is connected by the hereinbefore-mentioned passageway and pipe 33 to the reservoir 4 so that fluid under pressure may be constantly supplied from this reservoir 4 to the chamber 59 via this pipe and corresponding passageway 33 and passageway 18.

Slidably mounted in the stepped bore 58 is a valve stem 82 that intermediate its ends is provided with a collar 83 that abuts a diaphragm follower 84. The inner periphery of an annular diaphragm 85 is clamped between this diaphragm follower 84 and a diaphragm follower plate 86 that is secured to the diaphragm follower 84 by a nut 87 which has screw-threaded engagement with screw threads provided therefor on the lower end of the stem 82. The outer periphery of the diaphragm 84 is clamped between the casing section 16 and a lower casing section 88 of the service valve device 11.

Figure 2:
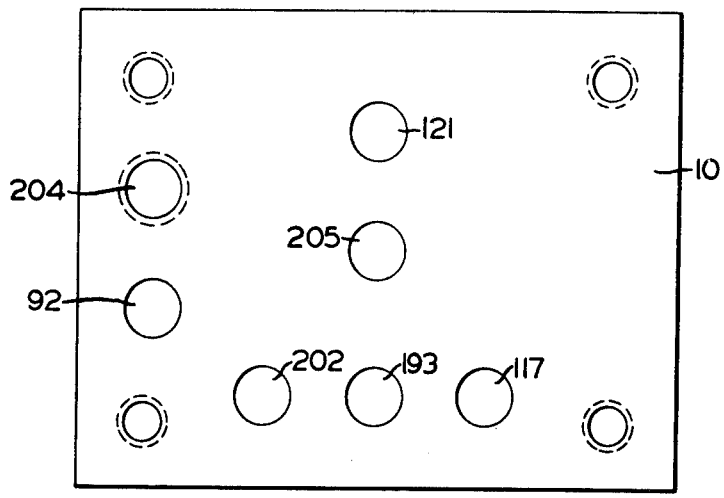
FIG. 2 is a top view of a ported horizontal gasket face formed on a pipe bracket of a brake control valve device shown in FIG. 1.
Figure 3:
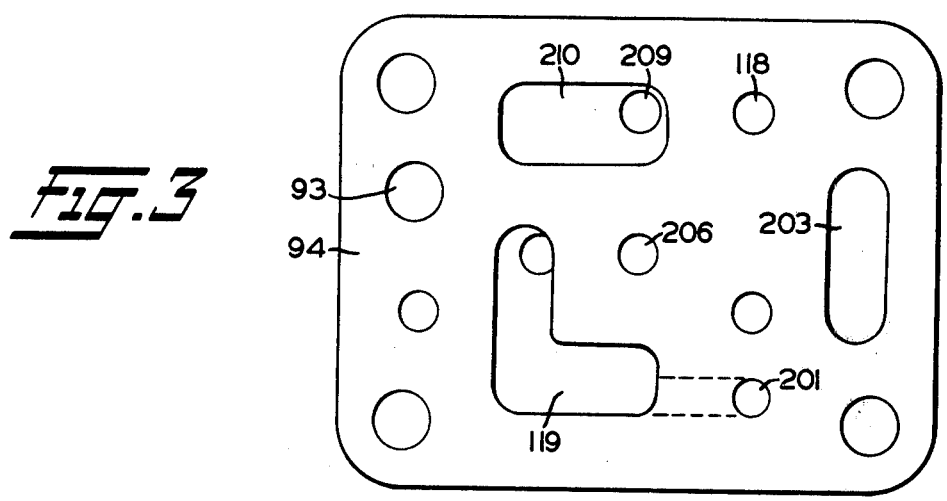
FIG. 3 is a view of a ported gasket face formed on the bottom of a valve cover that may be secured to the horizontal gasket face formed on the pipe bracket shown in FIG. 2 in either one of two positions.

The diaphragm 85 cooperates with the casing sections 16 and 88 to form within the service valve device 11 and on opposite sides of the diaphragm 85 a first pair of chambers 89 and 90. The chamber 89 is open to atmosphere via a passageway 91 that extend through the casing section 88 to the exterior surface thereof, and opening into the chamber 90 is one end of the hereinbefore-mentioned passageway 19. This passageway 19 extends through the casing section 16 and the pipe bracket 17 and at its other end is open at the surface of the gasket face 10 on this bracket 7 via a port in this gasket face, this port being indicated by the reference numeral 92 in FIG. 2 of the drawings which is a top view of this gasket face 10. The valve cover 13 is so constructed that, while it occupies a direct release position in which it is shown diagrammatically in FIG. 1, a port 93 in a flat gasket face 94 of this valve cover 13, a top view of which gasket face 94 is shown in FIG. 3, is in alignment with the port 92 in the gasket face 10. This port 93 is at one end of a passageway that extends through the valve cover 13 and at its other end is open at the exterior surface of this cover 13, this passageway being indicated diagrammatically in FIG. 1 by the reference numberal 95. Consequently, while the valve cover 13 occupies its direct release position, the chamber 90 above the diaphragm 85 is constantly open to atmosphere via passageway 19 that extends through the casing section 16 and pipe bracket 7, ports 92 and 93 and passageway 95 in valve cover 13.

As shown in FIG. 1 of the drawings, an inturned flange 96 formed on the lower end of a spring seat 97 abuts the upper side of the diaphragm follower 84, and a spring 98 is interposed between this flange 96 and the casing section 16 to normally bias the diaphragm follower plate 86 against a stop 99 formed on the casing section 88. The upper end of the spring seat 97 is provided with an out-turned flange 100 that is disposed above a snap ring 101 which is inserted into an annular groove provided therefor in the wall of the chamber 90. This snap ring 101 and out-turned flange 100 prevent the spring 98 from ejecting the valve stem 82 from the stepped bore 58 when the casing section 88 is disconnected from the casing section 16 when repairing or replacing broken or defective parts of the brake control valve device 5.

The valve stem 82 has formed thereon intermediate its ends an elongated peripheral annular groove 102 which, as shown in FIG. 1 of the drawings illustrating the relative positions of the parts of the brake control valve device 5 in the brake release position, is so located and arranged that the brake cylinder 2 is open to atmosphere via the pipe 31 and corresponding passageway in the pipe bracket 7, the passageway 34 in the blanking pad 12, the passageways 30 and 20, choke 23 in passageway 20, the upper portion of stepped bore 58, a bottomed bore 103 and a port 104 formed in the valve stem 82, the groove 102 thereon, and the passageway 26 that at one end opens at the wall surface of the stepped bore 58 and at the other end is open to atmosphere.

The annular diaphragm 85 is operatively connected to a second annular diaphragm 105 in a manner now to be described.

As can be seen from FIG. 1 of the drawings, the casing section 88 is provided with a bore 106 at the wall surface of which opens one end of a passageway 107. Slidably mounted in the bore 106 is a cylindrical quick service valve 108 on the periphery of which is formed an annular groove in which is disposed an O-ring seal 109 that forms a seal with the wall surface of the bore 106 so that, while the quick service valve 108 occupies the position shown in FIG. 1, the passageway 107 is cut off from a longitudinal groove 110 formed on the valve 108 and extending from a location just below the O-ring seal 109 to the lower end thereof.

The outer periphery of the diaphragm 105 is clamped between the casing section 88 and a bottom cover member 111, and the inner periphery is clamped between an annular diaphragm follower 112 and a cup-shaped diaphragm follower plate 113 that is secured to the diaphragm follower 112 by a plurality of cap screws 114, only two of which appear in FIG. 1 of the drawings, that pass through corresponding smooth bores in the follower plate 113 and have screw-threaded engagement with coaxial screw-threaded bottomed bores provided therefor in the diaphragm follower 112.

The diaphragm 105 cooperates with the casing section 88 and the bottom cover 111 to form within the brake control valve device 5 and on the opposite sides of the diaphragm 105 a second pair of chambers 115 and 116. Opening into the chamber 116 above the diaphragm 105 is the other end of the hereinbefore-mentioned passageway 41 so that the chamber 116 is charged with fluid under pressure from the brake pipe 1 via the branch pipe 6 and the passageway 27 that is connected at one end to branch pipe 6 and at the other end to this passageway 41.

Opening into the chamber 115 below the diaphragm 105 is one end of the hereinbefore-mentioned passageway 28 that extends through the bottom cover member 111, casing sections 88 and 16, and the pipe bracket 7 and at its outer end is open at the surface of the gasket face 10 on this bracket 7 via a port in this gasket face, this port being indicated by the reference numeral 117 in FIG. 2. The valve cover 13 is so constructed that, while it occupies its direct release position shown diagrammatically in FIG. 1, a port 118 (FIG. 3) in the gasket face 94 of valve cover 13 is in alignment with the port 117 in the gasket face 10. This port 118 is at one end of a passageway that extends through the valve cover 13 and at its other end opens into an L-shaped cavity 119 (FIG. 3) formed in the valve cover 13 and extending inward a chosen distance from the gasket face 94 of this cover 13, this passageway being indicated diagrammatically in FIG. 1 by the reference numeral 120.

The size of the L-shaped cavity 119 is such that while the valve cover 13 occupies its direct release position, this cavity 119 registers with a port 121 (FIG. 2) in the gasket face 10 on the pipe bracket 7, this port 121 being at that end of the hereinbefore-mentioned passageway 18 that opens at this gasket face 10. Consequently, while the valve cover 13 occupies its direct release position, the chamber 115 (FIG. 1) below the diaphragm 105 is connected to the reservoir 4 via the passageway 28 that extends through the bottom cover 111, casing sections 88 and 16, and pipe bracket 7, ports 117 (FIG. 2) and 118 (FIG. 3), passageway 120 (FIG. 1), cavity 119 (FIG. 3), port 121 (FIG. 2), passageway 18 (FIG. 1) and passageway and pipe 33.

In order to provide for the charging of the reservoir 4 from the brake pipe 1, the diaphragm follower 112 and diaphragm follower plate 113 embody therein a reservoir charging valve mechanism and a dissipation choke which now will be described.

As shown in FIG. 1 of the drawings, the diaphragm follower 112 is provided with a bore 122 that extends therethrough and two coaxial counterbores 123 and 124 that extend inward from the respective opposite sides thereof.

Slidably mounted in the bore 122 is a spool-type valve 125 that, intermediate its ends, is provided with an out-turned cylindrical flange 126. The diameter of this flange 126 is slightly less than the diameter of the counterbore 124. To enable this flange 126 to be slidable a chosen distance within the counterbore 124, the thickness of this flange is substantially less than the length of this counterbore 124. It will be noted from the drawings that the diaphragm follower plate 113 serves as a stop to limit the downward movement of this flange 126 and the valve 125, and that the upper end of the counterbore 124 constitutes a stop to limit their upper movement.

It will be further noted from FIG. 1 of the drawings that the valve 125 is provided with a passageway 127 that at one end opens at the lower end of valve 125 and at its other end opens at the bottom of an elongated peripheral annular groove 128 that is formed thereon above the out-turned flange 126 and below a peripheral annular groove adjacent the upper end thereof in which groove is disposed an O-ring seal 129.

In order to normally maintain the valve 125 in the position shown in which the upper end thereof abuts the lower end of the quick service valve 108 and the out-turned flange 126 thereon abuts the upper end of the counterbore 124, a spring 130, which is lighter than the spring 98, is interposed between this flange 126 and the bottom of the cup-shaped portion of the diaphragm follower plate 113.

While the spring 130 biases the flange 126 against the upper end of the counterbore 124, the groove 128 on the valve 125 is in alignment with the counterbore 123 thus establishing a communication from the chamber 116 to a chamber 131 formed by the cooperative relationship of the cup-shaped portion of the diaphragm follower plate 113, the lower end of the valve 125 and the out-turned flange 126 thereon.

As shown in FIG. 1 of the drawings, extending through the bottom of the cup-shaped portion or the diaphragm follower plate 113 is a bore 132 in which is secured, as, for example, by a press-fit, a choke fitting 133. This choke fitting 133 may be the same in construction as the choke fitting shown in U.S. Pat. No. 2,457,578, issued Dec. 28, 1948 to Charles W. Maliphant, and assigned to the assignee of the present application. As disclosed in this patent, this choke fitting 133 embodies therein a fluid straining element 134.

As shown in FIG. 1, a quick service cut-out valve device 135 is secured by any suitable means (not shown) to a gasket face 136 of the pipe bracket 7, there being a ported gasket 137 disposed between the gasket face 136 on the pipe bracket 7 and a gasket face 138 formed on the right-hand side of a body 139 of the quick service cut-out valve device 135.

The gasket face 138 on the body 139 corresponds to the gasket face 136 on the pipe bracket 7 in that opening at the surface of the gasket face 138 are the same number of ports as open at the surface of the gasket face 136, these ports being identically arranged therein and opening from corresponding passageways in the body 139 so that when the ported gasket 137 is placed between these two gasket faces and the body 139 secured to the pipe bracket 7 by any suitable means (not shown), the passageway 107 and a passageway 140 in the pipe bracket 7 extend into corresponding passageways in the body 139.

The passageway 107 extends through the body 139 and opens into a chamber 141 formed between the upper end of this body and the lower side of a diaphragm 142, the outer periphery of which is clamped between the body 129 and a cover member 143 secured to this body by any suitable means (not shown).

The inner periphery of the diaphragm 142 is clamped between an annular diaphragm follower 144 and a diaphragm follower plate 145 that is secured to the diaphragm follower by a nut 146 that has screw-threaded engagement with screw threads formed on a stem 147 that extends upward from the upper side of the diaphragm follower 144.

The body 139 is provided with a bottomed bore 148 into the bottom of which opens one end of a passageway 149 that extends through the body 139 and at its opposite end opens into the chamber 141 to prevent dash-pot action.

Slidably mounted in the bottomed bore 148 is a spool-type valve 150, the upper end of which is integral with the diaphragm follower 144. The valve 150 is provided with an elongated peripheral annular groove 151 and a longitudinal groove 152 that at one end opens into the annular groove 151 and at the other end into the chamber 141.

A spring 153 interposed between the follower plate 145 and the cover member 143 is normally effective to bias the diaphragm follower 144 against a stop surface 154 formed on the casing 139. While the spring 153 biases the diaphragm follower 144 against the stop surface 154, the grooves 152 and 151 establish a communication between the chamber 141 and one end of a passageway 155 that opens at the wall surface of the bottomed bore 148. This passageway 155 extends through the body 139 and opens within an annular valve seat 156 formed on the body 139. A screw-threaded cap 157 that has screw-threaded engagement with screw threads provided therefor in the body 139 cooperates with this body 139 to form a chamber 158 into which opens the passageway 140. Disposed within the chamber 158 is a flat disc-type valve 159 between which and the cap 157 is interposed a spring 160 that is normally effective to bias this valve 159 against the seat 156 to close communication between the passageway 155 and the chamber 158.

The spool valve 150 below the elongated peripheral annular groove 151 thereon is provided with two spaced-apart peripheral annular grooves in each of which is disposed an O-ring seal 161. The purpose of these O-ring seals 161 is to prevent flow of fluid under pressure from the chamber 141 and the passageway 149 to the passageway 155 when the pressure in the chamber 141 is increased sufficiently to deflect the diaphragm 142 upward against the yielding resistance of the spring 153 and thereby shift the spool valve 150 upward to a position in which the O-ring seals 161 respectively form seals with the wall surface of the bottomed bore 148 above and below the location at which the one end of the passageway 155 opens at this wall surface.

According to the present invention, a lost-motion connection is provided between the piston member 63 to which the flat disc-type supply valve 61 is bonded and a hollow exhaust valve element 162 to the lower end of which is bonded an annular resilient flat disc-type exhaust valve 163 the diameter of which is substantially less than the diameter of the annular disc-type supply valve 61 as is apparent from FIG. 1.

Adjacent its lower end, the exhaust valve element 162 is provided with an out-turned flange 164 and adjacent its upper end this valve element is provided with a peripheral annular groove in which is disposed an O-ring seal 165 that forms a seal with the wall surface of a bottomed bore 166 that is provided in the piston member 63 for slidably receiving therein the upper end of this exhaust valve element 162.

The piston member 63 is further provided with a counterbore 167 that is coaxial with the bottomed bore 166 therein and has a diameter somewhat larger than the diameter of the out-turned flange 164 that is disposed in this counterbore 167. The wall surface of this counterbore 167 is provided with a groove in which is inserted a snap ring 168 against which the flange 164 is normally biased by a spring 169 that is disposed in the bottomed bore 166 and interposed between the upper end of the exhaust valve element 162 and the upper end of this bottomed bore 166.

It will be noted from FIG. 1 that the length of the hollow exhaust valve element 162 is such that when the spring 169 biases the out-turned flange 164 against the snap ring 168 and the spring 62, via the spring seat 65 and piston member 63, biases the supply valve 61 against its seat 60, the annular exhaust valve 163 bonded to the lower end of the exhaust valve element 162 is disposed above and out of contact with the upper end of the valve stem 82. Therefore, the brake cylinder 2 is open to atmosphere via pipe and passageway 31, passageways 34, 30 and 20, upper end of stepped bore 58, bottomed bore 103 and port 104 in and groove 102 on valve stem 82 and passageway 26.

In order for the upward movement of the piston element 68 to effect compression of the spring 62 in a manner hereinafter explained and thereby remove the force of this spring from acting downward on the piston member 63 to press the supply valve 61 against its seat 60, the counterbore 67 in the piston element 63 is provided with a groove in which is inserted a snap ring 170, it being noted from FIG. 1 that this snap ring 170 is disposed below the annular spring seat 65 and has an inside diameter that is less than the outside diameter and greater than the inside diameter of this spring seat 65.

In order to prevent leakage of fluid under pressure from either of the chambers 59 and 77 to the other, the bushing 71 adjacent each of its ends is provided with a peripheral annular groove in which is disposed an O-ring seal 171 that forms a seal respectively with the wall surface of the counterbore 72 in the casing section 16 and a counterbore 172 provided in the top cover member 42 for receiving therein the out-turned flange 73 that is integral with the upper end of the bushing 71.

Also, in order to prevent leakage of fluid under pressure from either of the chambers 59 and 77 to the other, both the piston member 63 and the piston element 68 have a peripheral annular groove in which grooves are disposed respectively O-ring seals 173 and 174. The O-ring seal 173 forms a seal with the wall surface of the counterbore 67 in the piston element 68 and the O-ring seal 174 forms a seal with the wall surface of the counterbore 64 in the bushing 71.

As shown in FIG. 1, opening at one end into the stepped bore 58 is a passageway 175 that extends through the casing section 16 and at its opposite end opens at the wall surface or the counterbore 72 at such a location as to be in alignment with a port 176 in the bushing 71. This port 176 is in alignment with a port 177 that is provided in the piston element 68 below the O-ring seal 174 carried by this piston element 68. Therefore, while the exhaust valve 163 is unseated from its seat 178 formed on the valve stem 82 at the upper end of the bottomed bore 103, as shown in FIG. 1, a chamber 179 formed between the piston element 68 and the upper end of the piston member 63 is open to atmosphere via the port 177, a groove 180 formed on piston element 68, port 176, passageway 175, stepped bore 58, past valve seat 178, bottomed bore 103, port 104, groove 102 and passageway 26.

OPERATION

(A) Direct Release Operation

While the removable valve cover 13 is secured to the gasket face 10 on the pipe bracket 7 in its direct release position (FIG. 1), with a ported gasket 181 disposed between the gasket face 10 and the gasket face 94 on this valve cover 13, the hereinbefore-described ports and passageways in this valve cover 13 establish the connections between the passageways in the pipe bracket 7 as shown diagrammatically in FIG. 1 of the drawings. Therefore, the brake control valve device 5 is conditioned for direct release operation.

Let it be assumed that the brake control valve device 5 is provided on a railway freight car that is one car in a train of cars that are hauled by a locomotive which is provided with an engineer's brake valve device (not shown) that in construction and operation is the same as the engineer's brake valve device shown and described in U.S. Pat. No. 2,958,561 issued Nov. 1, 1960, to Harry C. May, and assigned to the assignee of the present application.

Let it be further assumed that a manually positionable selector valve device of the above-mentioned engineer's brake valve device is set in that one of its positions referred to in U.S. Pat. No. 2,958,561 as freight position.

Initial Charging

Assume initially that all the passageways and chambers in the brake control valve device 5 shown in FIG. 1 of the drawings are devoid of fluid under pressure, that the various parts of the brake control valve device 5 are in the respective positions in which they are shown in FIG. 1, that a main reservoir (not shown) on the locomotive is charged with fluid under pressure to a chosen pressure and connected to the engineer's brake valve device, and that it is desired to initially charge the brake apparatus on all the cars in the train.

To effect initial charging of the brake apparatus on all the cars in the train, the engineer will move a handle (not shown) of the engineer's brake valve device to its running (i.e., release) position to cause the supply of fluid under pressure from the main reservoir to the train brake pipe and, therefore, to the brake pipe 1 shown in FIG. 1.

On a car that is equipped with the brake control valve device 5, fluid under pressure flows from the brake pipe 1 to the counterbore 36 and upper side of the piston 38 via the branch pipe 6, and passageways 27 and 41.

As the pressure on the upper side of piston 38 is increased, this piston 38 is moved downward against the yielding resistance of the spring 47 until the emergency valve 37 abuts the bottom of bottomed bore 35. In this lower position, the upper one of four O-ring seals 53 carried by the emergency valve 37 forms a seal with the wall surface of the bottomed bore 35 at a location below the location at which the one end of the passageway 54 opens at this wall surface. Thus, a communication between a passageway 182 and the passageway 54 is established whereupon the chamber 77 above the piston element 68 is open to atmosphere via passageway 54, chamber 40, the passageway 182, passageway 20, upper end of stepped bore 58, past valve seat 178, bottomed bore 103, port 104, groove 102 and passageway 26.

Fluid under pressure supplied from the brake pipe 1 to the passageway 41 will also flow to the chamber 116 above the diaphragm 105. While the parts of the brake control valve device 5 occupy the position in which they are shown in FIG. 1 of the drawings, fluid under pressure supplied to the chamber 116 above the diaphragm 105 will flow to the chamber 115 below this diaphragm 105 via counterbore 123, groove 128 on and passageway 127 in valve 125, chamber 131 and choke fitting 133, and thence to the reservoir 4, which constitutes an auxiliary reservoir while the brake control valve device 5 is conditioned for both direct release and graduated release operation, via passageways 28, 120, and 18 and passageway and pipe 33, until the pressure in the chamber 115 and the auxiliary reservoir 4 is increased to the normal fully charged pressure carried in the brake pipe 1, it being noted that the size of the choke fitting 133 determines the rate at which the chamber 115 and the auxiliary reservoir 4 are charged.

Some of the fluid supplied from the brake pipe 1 to the passageway 27 flows to the lower side of a spring-loaded check valve 183 (FIG. 1) in the valve cover 13 via the passageway 29 in the pipe bracket 7, a passageway 184 in the valve cover 13 and a choke 185 in this passageway 184. When the check valve 183 is thus unseated from a valve seat 186, fluid under pressure will flow from passageway 184 to a chamber 187 and thence to the reservoir 3, which constitutes an emergency reservoir, via a passageway 188 in the valve cover 13 and the passageway and pipe 32 until the pressure in this reservoir 3 is increased to the normal fully charged pressure carried in the brake pipe 1, which, for example, may be 70 pounds per square inch.

It will be noted from FIG. 1 that some of the fluid under pressure supplied to the passageway 188 flows to the passageway 17 via a passageway 189 in the valve cover 13. However, the fluid under pressure supplied to the counterbore 36, as hereinbefore explained, has moved the emergency valve 37 to its lower position so that communication is closed between passageways 17 and 57.

SERVICE APPLICATION OF THE BRAKES

In effecting a service application of the brakes, initiation of such an application will be effected by the engineer moving the handle of the brake valve device from its running (i.e. release) position into its service application zone to a position corresponding to the degree of brake application desired, whereupon this brake valve device effects a redution of the pressure in the brake pipe 1 and the chamber 116 above diaphragm 105 at a service rate in the manner described in the hereinbefore-mentioned U.S. Pat. No. 2,958,561.

The size of the choke fitting 133 is such that the flow of fluid under pressure therethrough is less than a service rate. Therefore, fluid under pressure cannot flow from the chamber 115 to the chamber 116 and thence to the brake pipe 1 via this choke fitting 133, chamber 131, passageway 127 in and groove 128 on valve 125, bore 122, and counterbore 123 as fast as fluid under pressure is flowing from the chamber 116 to atmosphere via the train brake pipe and the brake valve device.

Accordingly, it is apparent that the pressure in the chamber 115 will quickly exceed the pressure in the chamber 116 and that this higher pressure in the chamber 115 will deflect the diaphragm 105 in an upward direction, as viewed in FIG. 1 of the drawings. Since the spring 130 is lighter than the spring 98, as hereinbefore stated, the initial upward deflection of the diaphragm 105 will shift the diaphragm follower 112, and diaphragm follower plate 113 upward relative to the quick service valve 128 and spool valve 125 until the flange 126 on this valve 125 abuts the diaphragm follower plate 113.

As the diaphragm follower 112 is thus shifted upward relative to valve 125 until flange 126 abuts diaphragm follower plate 113, the O-ring seal 129 carried by valve 125 is moved to a position in which this O-ring seal 129 forms a seal with the wall surface of the bore 122 at a location below the upper end thereof.

While the O-ring seal 129 forms a seal with the wall surface of the bore 122, communication is cut off between chambers 116 and 115.

As the pressure in the chamber 116 continues to be reduced by flow of fluid under pressure therefrom to atmosphere via the train brake pipe and the brake valve device, the difference in the pressures in the chambers 115 and 116 will increase to further deflect the diaphragm 105 in an upward direction.

Since the flange 126 on the valve 125 now abuts the diaphragm follower plate 113, this upward deflection of the diaphragm 105, diaphragm follower 112, valve 125 and diaphragm follower plate 113 is transmitted to the valve stem 82 via the quick service valve 108 to move this valve 108 and the stem 82 upward.

The length of the valve stem 82 is such that the O-ring seal 109 carried by the quick service valve 108 is moved to a position in which it forms a seal with the wall surface of the bore 106 at a location just above the location at which the one end of the passageway 107 opens at the wall surface of this bore at substantially the same time as the upper end of this stem 82 abuts the exhaust disc valve 163 to close communication between the brake cylinder 2 and atmosphere.

Upon movement of the quick service valve 108 to the position in which the O-ring seal 109 carried thereon forms a seal with the wall surface of the bore 106 just above the location at which the one end of the passageway 107 opens at this wall surface, fluid under pressure will flow from the brake pipe 1 to the brake cylinder 2 via branch pipe 6, passageways 27 and 41, chamber 116, groove 110 on quick service valve 108, passageway 107, chamber 141 in quick service cut-out valve device 135, grooves 152 and 151 on spool valve 150, passageway 155, past disc valve 159, chamber 158, passageway 140 and passageway and pipe 31.

As fluid under pressure flows from the brake pipe 1 to the brake cylinder 2 in the manner just described, the pressure in the chamber 141 below the diaphragm 142 of the quick service cut-out valve device 135 will increase. When the pressure in the chamber 141 has increased enough to overcome the yielding resistance of the spring 153, the diaphragm 142 will be deflected upward against the yielding resistance of this spring 153 until the follower plate 145 abuts the cover member 143.

This upward deflection of the diaphragm 142 is effective to move the valve 150 upward until the two O-ring seals 161 form seals with the wall surface of the bottomed bore 148 at locations that are respectively above and below the location at which the one end of the passageway 155 opens at this wall surface thereby cutting off further flow of fluid under pressure from the brake pipe 1 to the brake cylinder 2. The strength of the spring 153 is so selected that this cut off of flow to the brake cylinder 2 occurs when the pressure in this brake cylinder 2 reaches, for example, 9 pounds per square inch.

It is apparent from FIG. 1 that this quick service flow of fluid under pressure from the brake pipe 1 and chamber 116 to the brake cylinder 2 further increases the differential fluid pressure force acting upward on the diaphragm 105. Therefore, this force further deflects the diaphragm 105 in an upward direction thereby effecting further upward shifting of the quick service valve 108 and stem 82.

Since the upper end of the stem 82 abuts the exhaust valve 163, further upward movement of the stem 82 by the upward deflection of the diaphragm 105 shifts this exhaust valve 163, exhaust valve element 162, spring 169, piston member 63, supply valve 61 and annular spring seat 65 upward against the yielding resistance of the spring 62 because the spring 169 is stronger than the spring 62. This upward shifting of supply valve 61 unseats it from its seat 60. By thus unseating supply valve 61 from its seat 60, a communication is established through which fluid under pressure is permitted to flow from the auxiliary reservoir 4 to the brake cylinder 2 via pipe and passageway 33, passageway 18, choke 22, chamber 59, thence past annular valve seat 60, and through the stepped bore 58, passageway 20, choke 23, passageways 30 and 34, and passageway and pipe 31.

It may be noted from FIG. 1 that the fluid under pressure from the auxiliary reservoir 4 which is present in the chamber 59 is acting upward on the piston member 63 on the area determined by the diameter of the bore 70 less the area determined by the diameter of the bottomed bore 166. Moreover, according to the present invention, while the supply valve 71 is unseated from its seat 60, fluid under pressure from the auxiliary reservoir 4 which is present in the chamber 59 is flowing past the valve seat 60 to the upper end of the stepped bore 59 and thence to the chamber 179 above the piston member 63 via the passageway 175, port 176, groove 180 and port 177.

Also, according to the present invention, since brake pipe pressure from passageway 41 is now effective to maintain the emergency valve 37 in its lower position in which the upper O-ring seal 53 carried by this valve 37 forms a seal with the wall surface of the bottomed bore 35 at a location that is below the location at which the one end of the passageway 54 opens at the wall surface of this bottomed bore 35, some of the fluid under pressure supplied to the passageway 20 will flow to the chamber 77 above the piston element 68 via passageway 182, chamber 40, upper end of bottomed bore 35 and passageway 54. From the foregoing, it is apparent that the upper and the lower sides of the piston element 68 are both now subject to brake cylinder pressure.

It will be noted from FIG. 1 that the fluid under pressure in the chamber 77 acts over a larger area than the fluid under pressure in the chamber 179. Accordingly, it is apparent that this results in a differential fluid pressure force which acts in a downward direction on the piston element 68 to force it against the lower end of the counterbore 69 to maintain this piston element 68 in the position in which it is shown in FIG. 1. Consequently, the spring 62 is effective to transmit a force to the piston member 63 via the spring seat 65 and the shoulder 66 on this piston member 63.

Accordingly, it is apparent that the upper end of piston member 63 is subject to the sum of the force of the spring 62 and the fluid pressure force resulting from the fluid under pressure present in the chamber 179 acting downward on an area determined by the outside diameter of this piston member 63.

Moreover, it is apparent that this combined force is greater than the above-mentioned fluid pressure force acting upward on the piston member 63 on the area determined by the diameter of the bore 70 less the area determined by the diameter of the bottomed bore 166.

From the foregoing, it is apparent that these two forces acting in opposite directions result in a differential fluid pressure force which acts in a downward direction on the piston member 63.

SERVICE LAP

As shown in FIG. 1, the chamber 115 below the diaphragm 105 is connected to the auxiliary reservoir 4 via the passageways 28, 120, and 18, and passageway and pipe 33. Now if it be assumed that less than a full service reduction in brake pipe pressure has been effected by means of the brake valve device on the locomotive, then when the pressure in the auxiliary reservoir and chamber 115 below the diaphragm 105 is reduced by the flow of fluid under pressure past the unseated valve 61 to the brake cylinder 2 an amount substantially equal to the degree of reduction of brake pipe pressure in the chamber 116 above the diaphragm 105, the piston member 63, supply valve 61, spring 169, exhaust valve element 162, exhaust valve 163, stem 82, quick service valve 108, spool valve 125, diaphragm follower plate 113, diaphragm follower 112 and diaphragm 105 are moved downward by the combined force of the spring 62 and the above-mentioned differential fluid pressure force resulting from the fluid at brake cylinder pressure present in the chamber 179 acting downward on an area determined by the outside diameter of the piston member 63 to a service lap position in which the supply valve 61 is seated on its seat 60 with the upper end of the stem 82 in engagement with the bottom of the exhaust valve 163. This movement of the valve 61 into engagement with its seat 60 closes off further flow of fluid under pressure from the auxiliary reservoir 4 and chamber 115 to the brake cylinder 2.

If it be assumed that a full service reduction in brake pipe pressure has been effected by means of the brake valve on the locomotive, it will be understood that the strength of the spring 169 is such that the combined force of the spring 62 and the above-mentioned differential fluid pressure force resulting from the fluid at brake cylinder pressure present in the chamber 179 acting downward on the area determined by the outside diameter of the piston member 63 is great enough to compress the spring 169. Consequently, when the sum of the forces acting downward on the piston member 63 is great enough to overcome the force of the spring 169, the piston member 63 will be moved downward to seat supply valve 61 on its seat 60.

When the supply valve 61 is thus seated on its seat 60, further flow of fluid under pressure from the auxiliary reservoir 4 to the brake cylinder 2 and the chambers 77 and 179 is cut off which prevents a further reduction of the auxiliary reservoir pressure present in the chamber 115 below the diaphragm 105. This cut off of flow of fluid under pressure from the auxiliary reservoir 4 and the chamber 115 before the pressure therein is reduced to the brake pipe pressure present in the chamber 116 results in a differential fluid pressure force that acts in an upward direction on the diaphragm 105. Therefore, this differential fluid pressure force acting upward on the diaphragm 105 deflects this diaphragm upward to thereby shift diaphragm follower plate 113, diaphragm follower 112, valves 125 and 108, stem 82, diaphragm follower plate 86 and diaphragm follower 84 upward until the diaphragm follower 112 abuts the casing section 88, it being understood that the strength of the springs 98 and 169 is such that the yielding resistance developed by these springs as they are compressed does not become equal to the upwardly acting differential fluid pressure force on the diaphragm 105 before the diaphragm follower 112 abuts the casing section 88.

The service portion 11 is now in a lap position.

It should be noted that, subsequent to effecting a full service brake application in the manner described above, any further reduction in brake pipe pressure, which would constitute an over-reduction, is ineffective to cause a further increase in brake cylinder pressure. This is apparent when it is remembered that the diaphragm follower 112 was moved upward into abutting relationship with the casing section 88 when the hereinbefore described full service brake application was effected. Consequently, the differential fluid pressure force acting in an upward direction on diaphragm 105 as a result of a further reduction, or an over-reduction of brake pipe pressure in the chamber 116, cannot shift the valve stem 82, exhaust valve 163, exhaust valve element 162, spring 169 and piston member 63 to the lower end of which is secured the supply valve 61 upward to unseat valve 61 from its seat 60.

If, after a less than full service application of the brakes has been effected, it is desired to increase the brake cylinder pressure, a further reduction in brake pipe pressure is effected through the medium of the engineer's brake valve device which causes the diaphragm 105 to be deflected upward to again unseat valve 61 from its seat 60 so that fluid under pressure again flows from the auxiliary reservoir 4 and chamber 115 to the brake cylinder 2 until the supply valve 61 in the service portion 11 is again moved to its lap position.

It will be remembered that the quick service brake pipe venting action is eliminated upon a succeeding reduction in brake pipe venting action is eliminated upon a succeeding reduction in brake pipe pressure since the pressure in the chamber 141 maintains the spool valve 150 of the quick service cut-out valve device 135 in its cut-off position.

RELEASE OF A SERVICE BRAKE APPLICATION

To effect a release of the brakes after a service brake application, the engineer returns the handle of the engineer's brake valve device to its running position to effect the supply of fluid under pressure to the brake pipe 1 in the manner described in U.S. Pat. No. 2,958,561.

Fluid under pressure thus supplied to the brake pipe 1 will flow to the chamber 116 via the pathway hereinbefore described to cause an increase of the pressure in this chamber which, when the pressure in this chamber 116 becomes greater than the pressure in chamber 115, creates a pressure differential on the diaphragm 105 that causes this diaphragm to be deflected in a downward direction.

As the diaphragm 105 is thus deflected downward, the diaphragm follower plate 113 is moved downward therewith until it abuts cover 111. The spring 98, acting through the spring seat 97, diaphragm follower 84, follower plate 86 and nut 87, will now shift the stem 82, quick service valve 108 and spool valve 125 downward until the diaphragm follower plate 86 abuts the stop 99 on the lower casing section 88, as shown in FIG. 1.

In this position of the valve 125, the communication between the chambers 116 and 115 is reopened via the passageway 127 in and groove 128 on this valve 125, bore 122 and counterbore 123. The auxiliary reservoir 4 will now be recharged from the brake pipe 1 to the normal fully charged pressure carried in the train brake pipe.

As the valve stem 82 is shifted downward by the spring 98, in the manner described above, the spring 169 is rendered effective to shift the exhaust valve element 162 and exhaust valve 163 downward until the outturned flange 164 abuts the snap ring 168.

As the valve stem 82 is shifted further downward by the spring 98, as described above, the upper end of this stem 82 will be moved downward away from the bottom of the exhaust valve 163.

Upon movement of the upper end of the valve stem 82 away from the bottom of valve 163, all of the fluid under pressure in the brake cylinder 2 will flow to atmosphere via pipe and passageway 31, passageway 34 in blanking pad 12, passageways 30 and 20, choke 23, upper or larger end of stepped bore 58, bottomed bore 103 and port 104 in and groove 102 on stem 82, and passageway 26 thereby effecting a direct release of the previously effected service brake application.

It will be noted from FIG. 1 that fluid under pressure will now flow from the chamber 77 above piston element 68 to atmosphere via passageway 54, upper end of bottomed bore 35 (since emergency valve 37 is now in its lower position), chamber 40, passageways 182 and 20, upper end of stepped bore 58, bottomed bore 103 and port 104 in and groove 102 on stem 82 and passageway 26.

Furthermore, fluid under pressure will now flow from chamber 179 below the piston element 68 to atmosphere via port 177, groove 180, port 176, passageway 175, upper end of stepped bore 58 and the pathway just described.

Furthermore, when the spring 98 shifts the quick service valve 108 downward to the position shown in FIG. 1, the O-ring seal 109 carried on this valve 108 will form a seal with the wall surface of the bore 106 below the location at which the one end of the passageway 107 opens at this wall surface. Therefore, the fluid under pressure in the chamber 141 below the diaphragm 142 of the quick service cut-out valve device 135 will now flow to atmosphere via the passageway 107, the clearance between the peripheral surface of the valve 108 and the wall surface of the bore 106, the chamber 89 and the passageway 91 which is open to atmosphere.

Upon the release of all fluid under pressure from the chamber 141 to atmosphere, the spring 153 will return the diaphragm 142 and valve 150 to the position shown in FIG. 1 thereby reestablishing a communication between the passageways 107 and 155.

From the foregoing, it is apparent that, since, when effecting a service brake application, the fluid under pressure that is supplied to the brake cylinder 2 is also simultaneously supplied to the chambers 77 and 179 on the respective upper and lower faces of the piston element 68, this piston element 68 is not shifted upward to cause the snap ring 170 carried by this piston element 68 to abut the bottom of the spring seat 65 and thereafter lift this spring seat 65 upward from the shoulder 66 on the piston member 63 so that the spring 62 no longer transmits a force to this piston member 63. Consequently, this piston member 63 is subject to the force of the spring 62 which acts in a downward direction and also a fluid pressure force as the result of the fluid under pressure in the chamber 179 acting downward on an area determined by the outside diameter of the piston member 63. Thus, the spring 62 serves to limit the pressure obtained in the brake cylinder 2 when a service brake application is effected.

Since the strength of this spring 62 can be increased or decreased by means of the adjusting screw 79, the pressure obtained in the brake cylinder 2 when effecting a service brake application may be selectively increased or decreased to provide the proper braking force to adequately brake the railway vehicle on which the brake apparatus constituting the present invention may be installed.

EMERGENCY APPLICATION OF THE BRAKES

An emergency brake application differs from a service application only in that when all fluid under pressure is vented from the brake pipe 1 and the upper end of the counterbore 36 above the emergency spool valve 37 and actuating piston 38 to atmosphere, the spring 47 moves this emergency spool valve 37 and actuating piston 38 upward to the position shown in FIG. 1.

Upon movement of the emergency valve 37 to the position shown in FIG. 1, the groove 55 thereon establishes a communication between the passageways 54 and atmosphere via the groove 55 on and a port 190 and a bottomed bore 191 in the emergency spool valve 37, the lower end of the bottomed bore 35 and an exhaust passageway 192 in the casing section 16.

Therefore, communication is closed between the passageways 182 and 54 so that fluid under pressure supplied to the brake cylinder 2 when an emergency brake application is effected cannot flow to the chamber 77 above the piston element 68 and this chamber 77 is open to atmosphere.

Furthermore, upon movement of the emergency valve 37 to the position shown in FIG. 1, the groove 56 thereon establishes a communication between the passageway 17 and the passageway 57 that opens into the passageway 18 intermediate the ends thereof, as hereinbefore explained. Thus, the emergency reservoir 3 is connected to the auxiliary reservoir 4 via pipe and passageway 32, passageways 188 and 189 in valve cover 13, passageway 17 in pipe bracket 7 and casing section 16, choke 21, groove 56 on emergency valve 37, passageways 57 and 18, choke 22, and passageway and pipe 33.

Accordingly, when the supply valve 61 is unseated from its seat 60 by the upward movement of the stem 82, the fluid under pressure in both the emergency reservoir 3 and the auxiliary reservoir 4 will flow into the upper end of the stepped bore 58 and thence to the brake cylinder 2 via passageway 20, choke 23, passageways 30 and 34 and passageway and pipe 31. Thus, the fluid under pressure in both the emergency reservoir 3 and in the auxiliary reservoir 4 will equalize into the brake cylinder 2 thereby providing a higher brake cylinder pressure when an emergency brake application is effected than is obtained during a service brake application.

It will be noted that some of the fluid under pressure supplied to the stepped bore 58 flows therefrom to the chamber 179 below the piston element 68 via the passageway 175, port 176, groove 180 and port 177.

Since fluid under pressure supplied to the passageway 20 and thence to the brake cylinder 2 cannot flow to the chamber 77 above the piston element 68 while the emergency valve 37 occupies its emergency position in which it is shown in FIG. 1, the fluid under pressure supplied to the chamber 179 below this piston element 68 is effective to shift this piston element 68 and the snap ring 170 carried thereby upward until this snap ring 170 abuts the lower side of the annular spring seat 65. Thereafter, as the piston element 68 continues to be shifted upward by the fluid under pressure supplied to the chamber 179, the snap ring 170 lifts the spring seat 65 upward from the shoulder 66 on the piston member 63 against the yielding resistance of the spring 62. The increasing pressure of the fluid supplied to the chamber 179 now shifts the piston element 68 upward until the fluid pressure force acting upward on the piston element 68 is balanced by the downwardly acting force of the spring 62. Thus, the force of the spring 62 is completely removed from the piston member 63.

It may be noted that while the supply valve 61 is unseated from its seat 60, fluid under pressure from both the emergency reservoir 3 and the auxiliary reservoir 4 which is present in passageway 18 and chamber 59 is acting upward on the piston member 63 on the area determined by the diameter of the bore 70 less the area determined by the diameter of the bottomed bore 166.

Moreover, the fluid under pressure from both the emergency reservoir 3 and the auxiliary reservoir 4 that is supplied via the pathway described above to the chamber 179 acts downward on the piston member 63 on an area determined by the outside diameter of this piston member 63 or, in other words, on an area determined by the diameter of the bore 70 in which this piston member 63 is slidably disposed.

From the foregoing, it is apparent that the fluid under pressure acting in a downward direction on piston member 63 acts on a larger area than the fluid under pressure acting in an upward direction. Consequently, it is apparent that a differential fluid pressure force will be developed which will move the piston element 63 downward until the supply valve 61 carried on the lower end thereof is seated on the valve seat 60 thereby cutting off further flow of fluid under pressure from the emergency reservoir 3 and auxiliary reservoir 4 to the brake cylinder 2.

Since the force of the spring 62 has been removed from the piston member 63 by the fluid under pressure in the chamber 179 in the manner explained above so that the force of this spring 62 does not assist in moving this piston member 63 downward, as is the case when a service brake application is effected, it is apparent that when an emergency brake application is effected, a higher pressure is obtained in the brake cylinder 2 before the supply valve 61 is seated on the valve seat 60 than is the case when effecting a full service brake application.

As when effecting a service brake application, the seating of the supply valve 61 on its seat 60 cuts off flow of fluid under pressure from the auxiliary reservoir 4 to the brake cylinder 2 and the chamber 179 which prevents a further reduction or the auxiliary reservoir pressure in the chamber 115 below the diaphragm 105.

When an emergency brake application is effected, all fluid under pressure is released from the train brake pipe and therefore the chamber 116 above the diaphragm 105. Therefore, the auxiliary reservoir pressure present in the chamber 115 acting in an upward direction on the diaphragm 105 is effective to maintain the diaphragm follower plate 112 in abutting relation with the casing section 88.

RELEASE OF AN EMERGENCY BRAKE APPLICATION

The release of an emergency brake application is the same as the release of a service brake application except as the brake pipe 1 is charged from atmospheric pressure, fluid under pressure will flow from the brake pipe 1 to the counterbore 36 and upper side of the piston 38. As the pressure on the upper side of the piston 38 is increased, this piston 38 and emergency valve 37 are moved downward against the yielding resistance of the spring 47 until the emergency valve 37 abuts the bottom of bottomed bore 35. In this lower position, the upper one of the four O-ring seals 53 carried by the emergency valve 37 forms a seal with the wall surface of the bottomed bore 35 at a location below the location at which the one end of the passageway 54 opens at this wall surface. Therefore, the chamber 77 above the piston element 68 is connected to the passageway 20 via the passageway 54, upper end of the bottomed bore 35, chamber 40 and the passageway 182. It will be remembered, however, that no fluid under pressure was supplied to the chamber 77 when the emergency brake application was effected. Therefore, there is no fluid under pressure in the chamber 77 to be released to atmosphere.

The supply of fluid under pressure from the brake pipe 1 to the chamber 116 will cause the return of the diaphragm 105 and stem 82 to the position shown in FIG. 1 in the same manner as hereinbefore described for effecting a brake release subsequent to effecting a service brake application.

Upon the return of the stem 82 to the position shown in FIG. 1, fluid under pressure will be released from the brake cylinder 2 to atmosphere via the pathway described for effecting a brake release subsequent to effecting a service brake application.

Moreover, fluid under pressure will now be released from the chamber 179 to atmosphere via port 177, groove 180, port 176, passageway 175, the upper end of the stepped bore 58, bottomed bore 103, port 104, groove 102, and passageway 26. Spring 62 will now shift annular spring seat 65 downward until it abuts shoulder 66.

The auxiliary reservoir 4 will now be charged via the spool valve 125 and the emergency reservoir 3 will be charged via the check valve 183 until the pressure in these reservoirs is the same as the normal fully charged pressure in the brake pipe 1.

(B) GRADUATED RELEASE OPERATION

Let it be supposed that it is desired to convert the brake control valve device 5 from a direct release type brake control valve device to a graduated release type brake control valve device.

The brake control valve device 5 may be converted from a direct release type brake control valve device to a graduated release type brake control valve device by first, removing the valve cover 13 and the ported gasket 181 from the gasket face 10 on the pipe bracket 7.

Next, this valve cover 13 and the ported gasket 181 are rotated, in a plane substantially parallel to the gasket face 10, through an angle of 180°.

Thereafter, the valve cover 13 and gasket 181 in this rotated position, are again removably secured to the gasket face 10 on the pipe bracket 7, it being understood that the ported gasket 181 is disposed between the gasket face 10 and the valve cover 13 and occupies its original position with respect to the gasket face 94 on this valve cover 13.

While the valve cover 13 and ported gasket 181 are secured to the gasket face 10 on the pipe bracket 7 in this second or graduated release position, the hereinbeforementioned L-shaped cavity 119 (FIG. 3) that extends inward a chosen distance from the gasket face 94 on this cover 13, and a like L-shaped port in the gasket 181, connect together the hereinbefore-mentioned port 117 (FIG. 2) in the gasket face 10, which port 117 is at the end of the passageway 28 that opens at this gasket face 10, and a second port 193 in this gasket face 10, which port 193 is at that end of the passgeway 32 that opens at this gasket face 10.

Figure 4:
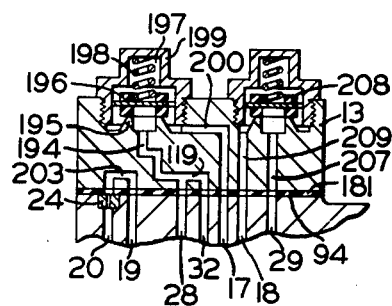
FIG. 4 is a diagrammatic view of the connections made by the valve cover with the passageways in the pipe bracket when this cover is secured to the horizontal gasket face in a graduated release position.

Provided in the valve cover 13 is a passageway that is indicated diagrammatically in FIG. 4 by the numeral 194. One end of this passageway 194 opens into the L-shaped cavity 119 (FIGS. 3 and 4) in this valve cover 13 and the other end opens within an annular valve seat 195 shown diagrammatically in FIG. 4, it being understood that this valve seat is provided within the valve cover 13.

As further shown diagrammatically in FIG. 4, a flat disc valve 196 is disposed in a chamber 197 and is normally biased against the valve seat 195 by a spring 198 that is interposed between this disc valve 196 and a screw-threaded plug 199.

Opening into this chamber 197 is one end of a passageway 200 that is provided in the valve cover 13. The opposite end of this passageway 200 opens at the gasket face 94 of this valve cover 13 via a port indicated in FIG. 3 by the numeral 201. This port 201 in the gasket face 94 of valve cover 13 is in alignment with a port 202 in the gasket face 10 of the pipe bracket 7 which port 202 is at that end of the passageway 17 in the pipe bracket 7 that opens at this gasket face 10. As shown in FIG. 1, this passageway 17 extends through the pipe bracket 7 and casing section 16 and at its other end opens at the wall surface of the bottomed bore 35.

Finally, the valve cover 13 is provided with a cavity 203 (FIG. 3) that extends inward a chosen distance from the gasket face 94 of this cover. While the valve cover 13 is secured to the gasket face 10 of the pipe bracket 7 in its graduated release position, this cavity 203 establishes a communication between the hereinbefore-mentioned port 92 (FIG. 2) in the gasket face 10 and a port 204 also in this gasket face 10. As shown in FIG. 2, this port 204 is located directly above the port 92 at such a distance therefrom as to enable the cavity 203 in the gasket face 94 of the cover member 13 to establish a communication between the passageway 19 and the passageway 20 that opens at the gasket face 10 via the port 204.

While the valve cover 13 is secured to the gasket face 10 of the pipe bracket 7 in its graduated release position, the service valve device 11 is enabled to operate in the manner of a graduated release control valve device, as will now be described.

In order that each brake control valve device on the cars in a train operate in the manner of a graduated release control valve device, it will be assumed that the hereinbeforementioned positionable selector valve device of the engineer's brake valve device is set in that one of its positions referred to in the above-mentioned U.S. Pat. No. 2,958,561 as passenger position.

INITIAL CHARGING

When the handle of the engineer's brake valve device on the locomotive is moved to its running (i.e. release) position, fluid under pressure will be supplied to the brake pipe 1 and thence to the counterbore 36, upper side of the piston 38 and chamber 116 (FIG. 1) in the manner hereinbefore described.

The fluid under pressure supplied to the counterbore 36 moves the piston 38 and emergency valve 37 to their lower position, and the fluid under pressure supplied to the chamber 116 flows therefrom to the chamber 115 via the passageway 127 in the valve 125, chamber 131 and choke fitting 133, and thence from the chamber 115 to the reservoir 3, which now constitutes a control reservoir, via passageway 28, cavity 119 (FIG. 4) in valve cover 13, and pipe and passageway 32 (FIG. 1) until this reservoir 3 is charged to the normal fully charged pressure carried in the brake pipe 1.

The auxiliary reservoir 4 is charged from the brake pipe 1 via passageway 27 and 29 (FIG. 1), a port 205 (FIG. 2) in the gasket face 10 on the pipe bracket 7, a port 206 (FIG. 3) in the gasket face 94 on the valve cover 13, a passageway 207 (FIG. 4) in the valve cover 13, thence past a check valve 208 (FIG. 4) to a passageway 209 that opens into a cavity 210 (FIG. 3) in the gasket fact 94. This cavity 210 now registers with the port 121 (FIG. 2) which port 121, as hereinbefore stated, is at that end of the passageway 18 that opens at the gasket face 10. Therefore, fluid under pressure will flow from the cavity 210 (FIG. 3) to the auxiliary reservoir 4 (FIG. 1) via the port 121 (FIG. 2), passageway 18 (FIG. 1) and passageway and pipe 33 until this reservoir 4 is charged to the normal fully charged pressure carried in the brake pipe 1.

It may be noted from FIG. 4 that fluid under pressure can flow from the cavity 119 in the valve cover 13 to the passageway 17 in the pipe bracket 7 and casing section 16 (FIG. 1) via the passageway 194 (FIG. 4), past check valve 196 and passageway 200. Since the emergency valve 37 is now in its lower position, communication between passageway 17 and 57 is closed.

SERVICE APPLICATION OF THE BRAKES

When fluid under pressure is released from the brake pipe 1 at a service rate in the manner hereinbefore decribed, the size of the choke fitting 133 prevents flow from the chamber 115 to the brake pipe 1 as fast as fluid under pressure is vented from the chamber 116 to atmosphere via the train brake pipe and the brake valve device.

Therefore, the diaphragm 105 will be deflected upward and communication between chambers 116 and 115 cut off in the manner hereinbefore explained in connection with direct release operation.

This upward deflection of the diaphragm 105 will shift the quick service valve 108 and valve stem 82 upward whereupon this quick service valve 108 will first cause flow of fluid under pressure from the brake pipe 1 to the brake cylinder 2 in the manner hereinbefore explained until the quick service cut-out valve device 135 operates to cut off this flow to the brake cylinder 2.

Next, this upward shifting of the valve stem 82 will cause the upper end of this stem 82 to first abut the exhaust valve 163 and thereafter shift this exhaust valve 163, exhaust valve element 162, spring 169, piston member 63, supply valve 61 and spring seat 65 upward against the yielding resistance of the spring 62 in the manner hereinbefore explained thereby unseating supply valve 61 from its seat 60.

Fluid under pressure will now flow from the auxiliary reservoir 4 to the brake cylinder 2 in the manner hereinbefore explained in connection with direct release operation.

SERVICE LAP

It will be noted from FIGS. 1 and 4, that some of the fluid under pressure supplied to the passageway 20 will flow to the chamber 90 above the diaphragm 85 via the chokes 23 and 24, cavity 203 (FIG. 4), and passageway 19 (FIG. 1), the chokes 23 and 24 in series controlling the rate of buildup of pressure in the chamber 90, and the choke 23 controlling the rate of buildup of pressure in the brake cylinder 2.

Fluid under pressure supplied to the chamber 90 in the manner explained above will increase the pressure therein and act in a downward direction on the effective area of diaphragm 85.

Furthermore, while the supply valve 61 is unseated from its seat 60, fluid under pressure will flow to the chambers 179 and 77 in the manner hereinbefore explained.

Now if it be assumed that less than a full service reduction in brake pipe pressure has been effected by means of the brake valve device on the locomotive, then when the pressure in the chamber 90 above the diaphragm 85 and in the chamber 179 above the piston member 63 has increased to such a value that the sum of the force of the spring 98, the fluid pressure force resulting from the fluid under pressure in the chamber 90 acting downward on the effective area of the diaphragm 85, the fluid pressure force resulting from the fluid under pressure in the chamber 179 acting downward on the piston member 63 and the fluid pressure force resulting from the reduced brake pipe pressure in the chamber 116 acting downward on the effective area of the diaphragm 105 is substantially equal to or slightly in excess of the upwardly acting fluid pressure force resulting from the control reservoir pressure in the chamber 115 acting upward on the effective area of the diaphragm 105, the piston member 63, supply valve 61, spring 169, exhaust valve element 162, exhaust valve 163, stem 82, quick service valve 108, spool valve 125, diaphragm follower plate 113, diaphragm follower 112 and diaphragm 105 are moved downward by the combined force of the spring 62 and the above-described differential fluid pressure forces resulting from the fluid at brake cylinder pressure present in the chambers 90 and 179 to a service lap position in which the supply valve 61 is seated on its seat 60 with the upper end of stem 82 in engagement with the bottom of the exhaust valve 163. This movement of the valve 61 into engagement with its seat 60 closes off further flow of fluid under pressure from the auxiliary reservoir 4 to the brake cylinder 2 and the chambers 77, 179 and 90.

It should be noted that the combined forces of the springs 62, 98 and 169, and the differential fluid pressure forces acting downward on the piston member 62, diaphragm 85 and diaphragm 105 at the time the supply valve 61 is seated on its seat 60 is insufficient to deflect the diaphragms 85 and 105 downward, against the control reservoir pressure present in the chamber 115 below the diaphragm 105, to the original position of these diaphragms 85 and 105. Therefore, the exhaust valve element 162, exhaust valve 163, stem 82, quick service valve 108, valve 125, diaphragm follower 112 and diaphragm follower plate 113 will remain in an upper position which is determined by the strength of the spring 98 and the degree of reduction of brake pipe pressure effected in the chamber 116 at the time the service brake application was effected.

If it be assumed that a full service reduction in brake pipe pressure has been effected by means of the brake valve device on the locomotive, it will be understood that the strength of the spring 169 is such that the combined force of the spring 62 and the above-mentioned differential fluid pressure force acting in a downward direction on the piston member 63 as the result of the supply of brake cylinder pressure to the chamber 179 is great enough to compress the spring 169. Consequently, when the sum of the forces acting downward on the piston member 63 is great enough to overcome the force of the spring 169, the piston member 63 will be moved downward to seat supply valve 61 on its seat 60.

This cut off of flow of fluid under pressure from the auxiliary reservoir 4 to the chamber 90 results in a differential fluid pressure force that acts in an upward direction on the diaphragms 105 and 85 which deflects these diaphragms upward to thereby shift diaphragm follower plate 113, diaphragm follower 112, valves 108 and 125, stem 82, diaphragm follower plate 86 and diaphragm follower 84 upward until the diaphragm follower 112 abuts the casing section 88, it being understood that the yielding resistance developed by springs 98 and 169 as they are compressed does not become equal to the upwardly acting differential fluid pressure force on the diaphragms 85 and 105.

The service portion 11 is now in a lap position.

Since the diaphragm follower 112 now abuts the casing section 88, any further reduction in brake pipe pressure, which would constitute an over-reduction, is ineffective to further increase the brake cylinder pressure.

GRADUATED RELEASE OF A SERVICE BRAKE APPLICATION

Since the operation of the brake control valve device 5 is the same in effecting either a partial or a complete graduated release of the brakes, it is believed that a description of one will suffice for both, it being understood that when a partial release of the brakes is effected, the pressure in the train brake pipe is not increased to its normal fully charged chosen pressure, and all the fluid under pressure in the brake cylinder 2 and chamber 90 is not released to atmosphere as is the case when a complete release is effected.

Let it be supposed that the engineer now desires to effect a complete brake release. Accordingly, he will move the handle of the brake valve device from the position it occupies in its service application zone back to its release position.

As this handle is thus returned to its release position, the brake pipe 1 is charged in the manner described in the hereinbefore-mentioned U.S. Pat. No. 2,958,561.

Fluid under pressure flows from the brake pipe 1 via the check valve 208 (FIG. 4) to charge the auxiliary reservoir 4 to the pressure carried in the train brake pipe in the manner hereinbefore described.

Fluid under pressure also flows to the chamber 116 (FIG. 1) in the manner hereinbefore described. It will be understood that the pressure in the chamber 116 is less than that in the chamber 115 for the reason that the pressure in this chamber 116 was reduced when the brake application was effected in the manner described above. Accordingly, as fluid under pressure flows from the brake pipe 1 to the chamber 116, the pressure in this chamber 116 will increase.

Upon the pressure in the chamber 116 increasing to a value that is slightly greater than the pressure in the chamber 115, a fluid pressure force is established which acts in a downward direction on the effective area of the diaphragm 105. Therefore, as the pressure in the chamber 116 and the brake pipe 1 exceeds the pressure in the chamber 115, this differential of pressure will deflect the diaphragm 105 downward to thereby shift the diaphragm follower 112, and diaphragm follower plate 113 downward relative to the quick service valve 108 and spool valve 125 until the upper end of the counterbore 124 in the diaphragm follower 112 abuts the flange 126 on the valve 125.

When the diaphragm follower 112 is thus shifted downward until the upper end of the counterbore 124 abuts the flange 126, a communication is again established between the chambers 116 and 115 via the groove 128 on and passageway 127 in valve 125, chamber 131 and choke fitting 133.

It will be noted that upon further downward movement of the diaphragm follower 112 and diaphragm follower plate 113, the valve 125 will be moved downward therewith since the flange 126 now abuts the upper end of the counterbore 124.

It is apparent that as the valve 125 is thus moved downward, the springs 98 and 169 and fluid under pressure in the chamber 90 are rendered effective to shift the exhaust valve element 162, exhaust valve 163, valve stem 82 and quick service valve 108 downward to maintain the lower end of this valve 108 against the upper end of the spool valve 125. Accordingly, the exhaust valve element 162, exhaust valve 163, valve stem 82, quick service valve 108, valve 125, diaphragm follower 112 and diaphragm follower plate 113 will all be moved downward until the out-turned flange 164 on the exhaust valve element 162 abuts the snap ring 168. Thereafter, the spring 98 and the fluid under pressure in the chamber 90 continue to shift the valve stem 82, quick service valve 108, valve 125, diaphragm follower 112 and diaphragm follower plate 113 downward until the diaphragm follower plate 113 abuts the bottom cover member 111.

Fluid under pressure will now flow from the brake cylinder 2 to atmosphere via pipe and passageway 31, passageway 34 in blanking pad 12, passageways 30 and 20, choke 23, stepped bore 58, bottomed bore 103, port 104, groove 102 and passageway 26 until all fluid under pressure is released from the brake cylinder 2 thereby completely releasing the brakes on the vehicle.

Since the chamber 90 is connected to the interior of the stepped bore 58 by the passageway 19, cavity 203 (FIG. 4), choke 24 and passageway 20 having choke 24 therein, fluid under pressure will be released from the chamber 90 to atmosphere at a rate determined by the size of the chokes 24 and 23 simultaneously as fluid under pressure is released from the brake cylinder 2 to atmosphere.

Furthermore, fluid under pressure will be released from the chambers 77 and 179 to atmosphere via pathways hereinbefore described in connection with effecting a release of a service brake application while the valve cover 13 occupies its direct release position.

It will be noted that upon effecting a brake application in the manner described above, the fluid under pressure in the control reservoir 3 and the chamber 115 are trapped therein. Therefore, upon effecting a brake release, the pressure in the control reservoir 3 and the chamber 115 is usually the same as the normal fully charged brake pipe pressure. Accordingly, there would normally be no flow of fluid under pressure from the brake pipe 1 to the control reservoir 3 upon return of the parts of the brake control valve device 5 to their release position in which they are shown in FIG. 1 of the drawings.

If, however, the pressure in the control reservoir 3 and the chamber 115 have been reduced by, as, for example, leakage or some other cause to a value less than the normal fully charged brake pipe pressure, then, upon the return of the parts of the brake control valve device 5 to their release position, as shown in FIG. 1 of the drawings, fluid under pressure will flow from brake pipe 1 and chamber 116 to the control reservoir 3 via groove 128 on and passageway 127 in spool valve 125, chamber 131, choke fitting 133, chamber 115, passageway 28, cavity 119 (FIG. 4) and passageway and pipe 32 at a rate determined by the size of the choke 133 until the pressure in the control reservoir 3 and chamber 115 is equal to the normal fully charged brake pipe pressure present in the brake pipe 1.

EMERGENCY APPLICATION OF THE BRAKES

When an emergency brake application is effected while the valve cover 13 is in its graduated release position (FIG. 4), all fluid under pressure is released from the counterbore 36 and above the piston 38 (FIG. 1) whereupon the spring 47 shifts piston 38 and emergency valve 37 to their upper position in which they are shown in FIG. 1 so that fluid under pressure is supplied from both the control reservoir 3 and auxiliary reservoir 4 to the brake cylinder 2 until the flow of fluid under pressure from both the control reservoir 3 and auxiliary reservoir 4 into the brake cylinder 2 is cut off by supply valve 60 seating on seat 61 thereby providing a higher brake cylinder pressure when an emergency brake application is effected the same as when the valve cover 13 occupies its direct release position.

It will be understood that no fluid under pressure is supplied to the chamber 77 and that the fluid under pressure supplied to the chamber 179 shifts the piston element 68 upward until the snap ring 170 abuts the spring seat 65 and thereafter lifts it upward from the shoulder 66 on the piston member 63 so that the force of the spring 62 is removed from the piston member 63 the same as when en emergency brake application is effected while the valve cover 13 occupies the direct release position.

Consequently, it is apparent that when an emergency brake application is effected, a higher pressure is obtained in the brake cylinder 2 before the supply valve 61 is seated on its seat 60 than is the case when effecting a full service brake application.

RELEASE OF AN EMERGENCY BRAKE APPLICATION

The release of an emergency brake application, while the valve cover 13 is in its graduated release position, is the same as hereinbefore described in connection with direct release operation except in graduated release operation the auxiliary reservoir 4 is charged via the check valve 208 (FIG. 4), and the control reservoir 3 is charged via the cavity 119 (FIG. 4).

DESCRIPTION — FIG. 5

Figure 5:
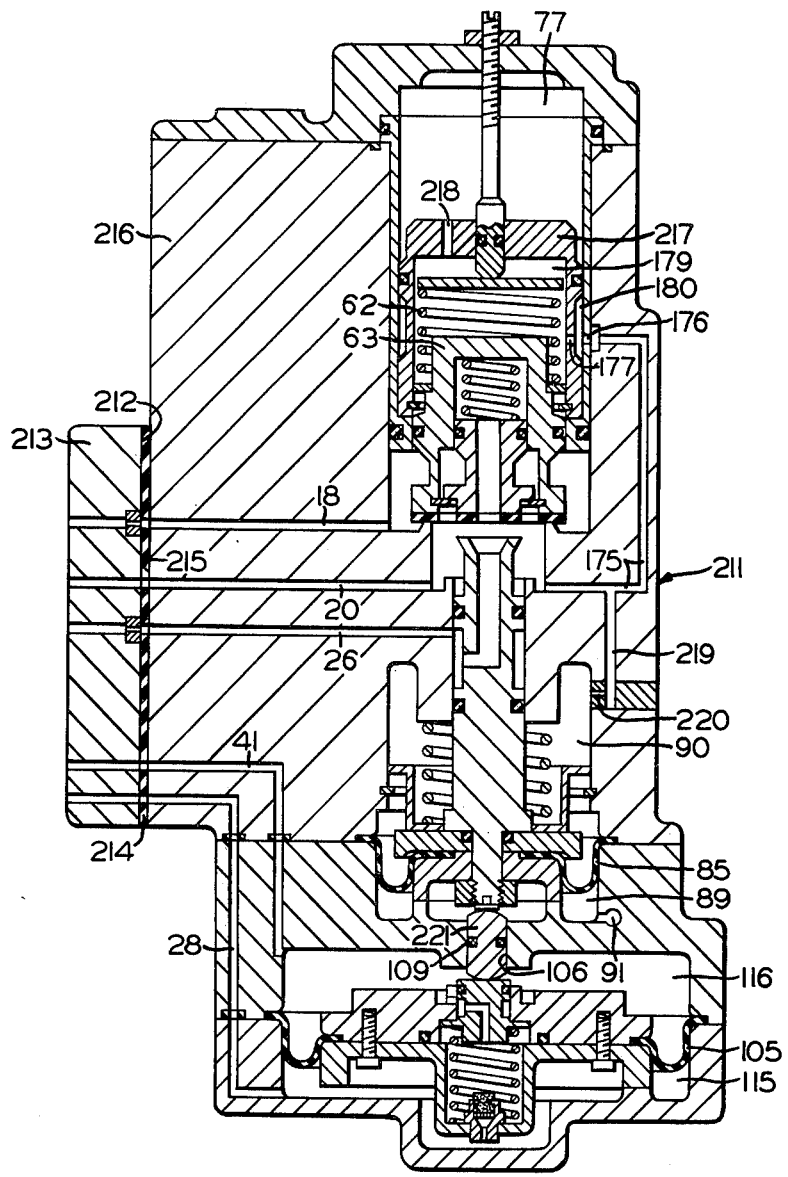
FIG. 5 is a diagrammatic view of a brake control valve device constructed in accordance with a second embodiment of the invention.

In FIG. 5 of the drawings, there is shown a vertical cross-sectional view of a brake control valve device 211 constructed in accordance with a second embodiment of the invention. This brake control valve device 211 is so constructed as to be suitable for use in a combined fluid under pressure and vacuum brake apparatus that may be installed on locomotives used to haul railway cars provided with either vacuum or fluid under pressure brake equipment. According to this second embodiment of the invention, the brake control valve device 211 shown in FIG. 5 differs from the brake control valve device 5 shown in FIG. 1 in that the emergency valve 37 and the quick service valve 108 of the brake control valve device 5 are not necessary in a brake control valve device 211 used in a combined fluid under pressure and vacuum brake apparatus and, therefore, are omitted from this brake control valve device 211.

Furthermore, it is not necessary that this brake control valve device 211 be conditioned for either direct or graduated release operation. Therefore, this brake control valve device 211 may be secured by any suitable means (not shown) to a gasket face 212 provided on the right-hand side of a pipe bracket 213 to which all pipe connections are made, there being a ported gasket 214 disposed between the gasket face 212 on the pipe bracket 213 and a gasket face 215 formed on the left-hand side of a casing section 216 of the brake control valve device 211.

Moreover, like reference numerals have been used to designate the structure shown in FIG. 5 which is identical to that shown in FIG. 1. Only such features of the structure and operation of the embodiment of the invention shown in FIG. 5 which differ from that of the embodiment of FIG. 1 will be hereinafter described.

In addition to the differences noted above, the brake control valve device 211 shown in FIG. 5 and constituting the second embodiment of the invention is provided with a piston element 217 that differs from the piston element 68 shown in FIG. 1 in that this piston element 217 is provided with a bore 218 that constitutes a communication through which fluid under pressure may flow from the chamber 179 below this piston element 217 to the chamber 77 above it. Therefore, the fluid under pressure that is supplied to the brake cylinder 2 also flows to the chamber 179 via the passageway 175, port 176, groove 180, and port 177 and thence to the chamber 77 via the bore 218 in the piston element 217. Since both the chamber 179 and the chamber 77 are always subject to brake cylinder pressure, the piston element 217 is never shifted upward to render the spring 62 ineffective to transmit a force to the piston member 63. Consequently, the pressure obtained in the brake cylinder 2 is always limited by the sum of the force of the spring 62 and the fluid pressure force acting downward on the piston member 63 as the result of the fluid under pressure present in the chamber 179 above this piston member 63. In other words, brake cylinder pressure is always limited in the manner hereinbefore described for the first embodiment of the invention when effecting a service brake application.

In order that the effective area of the upper side of the diaphragm 85 may be subject to brake cylinder pressure, the casing section 216 is provided with a passageway 219 that at one end opens into the passageway 175 intermediate the ends thereof and at the other end into the chamber 90 via a choke 220 that controls the rate of flow of fluid under pressure to and from the chamber 90 in the same manner as the choke 24 shown in FIG. 1.

Since the brake control valve device 211 is always operated as a graduated release brake control valve device, no means, such as the removable graduated or direct release valve cover 13 and the pipe bracket 7 shown in FIG. 1 for the first embodiment of the invention, is necessary for the brake control valve device 211.

It should be understood that when the brake control valve device 211 shown in FIG. 5 constitutes the brake control valve device in a combined fluid under pressure and vacuum brake apparatus on a locomotive used to haul a train of railway cars provided with vacuum brake equipment, the passageways in this valve device 211 are connected to the several elements comprising this brake apparatus in the manner described below.

The passageway 18 is connected to some suitable source of fluid under pressure which may be, for example, the main reservoir on the locomotive.

The passageway 20 is connected to a brake cylinder or to a relay valve device that is operated by fluid under pressure supplied thereto via the passageway 20 to effect the supply of fluid under pressure from some suitable source of fluid under pressure to a brake cylinder.

The passageway 26 is open to atmosphere.

The passageway 41 is connected to a vacuum control reservoir.

The passageway 28 is connected to a vacuum brake pipe.

It may be further noted that the brake control valve device 211 provides no quick service flow of fluid under pressure from the brake pipe to the brake cylinder. The cylindrical quick service valve 108 shown in FIG. 1 is replaced by a cylindrical member 221 which intermediate its ends is provided with a peripheral annular groove for receiving the O-ring 109 that forms a seal with the wall surface of the bore 106 to prevent leakage of fluid under pressure from the chamber 89 that is open to atmosphere via the passageway 91 into the chamber 116 which is connected to a vacuum control reservoir, as noted above.

Having now described the invention, what we claim as new and desire to secure by Letters Patent, is:

1. A fluid pressure controlled vehicle brake apparatus comprising, in combination:
   (a) a brake pipe, variations of the fluid pressure in which are effective to control brake applications and brake releases on the vehicle,
   (b) a first reservoir normally charged to a chosen pressure,
   (c) a second reservoir,
   (d) fluid pressure operated braking means for effecting a brake application on the vehicle,
   (e) a fluid pressure operated brake control valve device comprising:
      (i) valve means having a supply valve and an exhaust valve operable to effect the supply of fluid under pressure from said first reservoir to said fluid pressure operated braking means and the release of fluid under pressure from said fluid pressure operated braking means to atmosphere,
      (ii) a stem coaxially arranged with respect to said valve means for effecting the operation thereof,
      (iii) a first movable abutment subject on one side to the pressure of fluid in said brake pipe and subject on the opposite side to the pressure in said second reservoir, said first movable abutment being operatively connected to said stem to effect its movement in one direction in response to a change in the pressure on one side of said abutment relative to the pressure on the opposite side to cause one end of said stem to operate said valve means to effect the supply of fluid under pressure from said first reservoir to said braking means to cause a brake application on the vehicle,
      (iv) reservoir pressure control valve means carried on and so operable by said first movable abutment in response to changes in brake pipe pressure as to control the pressure in said second reservoir,
      (v) a second movable abutment so connected to said valve stem as to, when subject on said one side to fluid under pressure supplied to said braking means, effect movement of said stem in a direction opposite said one direction in response to the force of fluid under pressure acting on said second abutment in said opposite direction slightly exceeding the fluid pressure force acting in said one direction on said first movable abutment, said first movable abutment being responsive to a subsequent change in brake pipe pressure on said one side thereof to effect further movement of said stem in said opposite direction to cause said valve means to establish a venting communication whereby the fluid under pressure supplied to said braking means is released to atmosphere, and operation of said reservoir pressure control valve means to enable control of the pressure in said second reservoir, and wherein the improvement comprises:

(f) a lost-motion connection between said supply valve and said exhaust valve to enable shifting of said supply valve relative to said exhaust valve to a valve closed position, (g) means for subjecting said supply valve to the fluid under pressure supplied to said braking means, and (h) biasing means for subjecting said supply valve to a force acting in a valve-closing direction whereby said biasing force acts cojointly with the fluid under pressure supplied to said braking means to effect shifting of said supply valve to a valve closed position to cut off flow of fluid under pressure to said braking means thereby limiting the degree of pressure supplied to said braking means in accordance with the strength of said biasing means.

2. A fluid pressure controlled vehicle brake apparatus, as recited in claim 1, further characterized in that said lost-motion connection comprises:

(a) a cup-shaped piston member carrying said supply valve, (b) an exhaust valve element carrying said exhaust valve and slidably mounted in said cup-shaped piston member, (c) biasing means interposed between said piston member and said exhaust valve element for shifting said exhaust valve element in one direction relative to said piston member, and (d) stop means carried by said piston member for limiting the shifting of said exhaust valve element in said one direction by said biasing means.

3. A fluid pressure controlled vehicle brake apparatus, as recited in claim 1, further characterized in that said valve means further comprises:

(a) a cup-shaped piston element, and (b) a cup-shaped piston member carrying said supply valve so slidably mounted in said cup-shaped piston element as to in cooperation therewith form a chamber in which said biasing means is so disposed as to be interposed between said piston element and said piston member so that said biasing means is effective to subject said supply valve to a force acting in a valve-closing direction, and said means for subjecting said supply valve to the fluid under pressure supplied to said braking means comprises:

(c) conduit means through which the fluid under pressure supplied to said braking means is supplied to said chamber whereby said fluid under pressure supplied to said chamber establishes a fluid pressure force that acts on said piston member cojointly with said biasing means to effect shifting of said piston member in the direction to move said supply valve carried thereby to its valve closed position.

4. A fluid pressure controlled vehicle brake apparatus, as recited in claim 1, further characterized in that said means for subjecting said supply valve to the fluid under pressure supplied to said braking means comprises:

(a) a valve seat for said supply valve, (b) a valve seat for said exhaust valve, and (c) conduit means so arranged with respect to said valve seats that, while said exhaust valve is seated on its seat and said supply valve is unseated from its seat, the fluid under pressure supplied by said supply valve past its seat, while unseated therefrom, is supplied to said supply valve to effect in cooperation with said biasing means the shifting of said supply valve relative to said exhaust valve and its seat to said valve-closed position in which said supply valve is seated on its valve seat to cut off flow of fluid under pressure to said braking means without effecting shifting of said exhaust valve and its seat.

5. A fluid pressure controlled vehicle brake apparatus, as recited in claim 1, further characterized by means for selectively varying the force of said biasing means.

6. A fluid pressure controlled vehicle brake apparatus, as recited in claim 1, further characterized by manually adjustable means for varying the force of said biasing means.

7. A fluid pressure controlled vehicle brake apparatus, as recited in claim 6, further characterized by locking means for locking said manually adjustable means in an adjusted position.

8. A fluid pressure controlled vehicle brake apparatus comprising, in combination:

(a) a normally charged brake pipe, variations of the fluid pressure in which are effective to control brake applications and brake releases on the vehicle, (b) an auxiliary reservoir normally charged to the pressure carried in said brake pipe, (c) a second reservoir normally charged to the pressure carried in said brake pipe, (d) fluid pressure operated braking means for effecting a brake application on the vehicle, (e) a fluid pressure operated brake control valve device comprising:

(i) valve means having a supply valve and an exhaust valve operable to effect the supply of fluid under pressure from said auxiliary reservoir to said fluid pressure operated braking means and the release of fluid under pressure from said fluid pressure operated braking means to atmoshpere, (ii) a stem coaxially arranged with respect to said valve means for effecting the operation thereof, (iii) a first movable abutment subject on one side to the pressure of fluid in said brake pipe and subject on the opposite side to the pressure in one of said reservoirs, said first movable abutment being operatively connected to said stem to effect its movement in one direction in response to a reduction in brake pipe pressure on said one side relative to the pressure in one of said reservoirs on said opposite side to cause one end of said stem to operate said vale means to effect the supply of fluid under pressure from said auxiliary reservoir to said braking means to cause a brake application on the vehicle, (iv) reservoir charging valve means carried on and so operable by said first movable abutment in response to said reduction in brake pipe pressure as to cut off charging of one of said reservoirs and in response to an increase in the pressure in said brake pipe to the pressure in one of said reservoirs to enable charging of one of said reservoirs, and (v) a second movable abutment that may be selectively subject on one side to the fluid under pressure supplied by said valve means to said braking means or to atmospheric pressure and subject constantly on the opposite side to atmospheric pressure, said second movable abutment being so connected to said valve stem as to, when subject on said one side to fluid under pressure supplied to said braking means, effect movement of said stem in a direction opposite said one direction in response to the force of fluid under pressure acting on said second abutment in said opposite direction slightly exceeding the fluid pressure force acting in said one direction on said first movable abutment, said first movable abutment being responsive to a subsequent increase in brake pipe pressure on said one side thereof to effect further movement of said stem in said opposite direction to cause said valve means to establish a venting communication whereby the fluid under pressure supplied to said braking means is released to atmosphere, and operation of said reservoir charging valve means to enable charging of one of said reservoirs, and (f) selectively positionable means that, while in one of two positions, enables said opposite side of said first movable abutment to be subject to the pressure in said auxiliary reservoir, and said one side of said second movable abutment to be subject to atmospheric pressure, thereby to enable said first abutment, in response to variations of brake pipe pressure on said one side thereof, to operate said brake control service valve device in the manner of a direct release control valve device, and, while in the other of its two positions, enables said opposite side of said first movable abutment to be subject to the pressure in said second reservoir, and said one side of said second movable abutment to be subject to the pressure in said fluid pressure operated braking means, thereby to enable said first and second abutments, in response to variations of brake pipe pressure on said one side of said first abutment, to operate said brake control service valve device in the manner of a graduated release control valve device, wherein the improvement comprises:

(g) a lost-motion connection between said supply valve and said exhaust valve to enable shifting of said supply valve relative to said exhaust valve to a valve closed position, (h) biasing means for subjecting said supply valve to a force acting in a valve closing direction, (i) fluid pressure operated abutment means operable in response to the supply of fluid under pressure to both sides thereof to render said biasing means effective to subject said supply valve to the biasing force of said biasing means and in response to the supply of fluid under pressure to only one side thereof to render said biasing means ineffective to subject said supply valve to the biasing force of said biasing means, (j) means for simultaneously subjecting said one side of said fluid pressure operated abutment means and said supply valve to the fluid under pressure supplied by said supply valve to said fluid pressure operated braking means, and (k) fluid pressure operated valve means operable in response to the fluid under pressure in said brake pipe to subject the other side of said fluid pressure operated abutment means to the fluid under pressure supplied to said fluid pressure operated valve means and in response to the absence of fluid under pressure in said brake pipe to subject said other side of said abutment means to atmospheric pressure whereby said supply valve is selectively subject cojointly to the fluid under pressure supplied to said braking means and the force of said biasing means or solely to the fluid under pressure supplied to said braking means accordingly as fluid under pressure is present in or absent from said brake pipe thereby limiting the pressure obtained in said braking means when effecting a service brake application to a value less than that obtained in said braking means when effecting an emergency brake application.

9. A fluid pressure controlled vehicle brake apparatus, as recited in claim 8, further characterized in that said lost-motion connection comprises:

(a) a cup-shaped piston member carrying thereon said supply valve and subject selectively on its exterior solely to said fluid under pressure supplied to said braking means or cojointly to said fluid under pressure and said biasing means accordingly as said fluid pressure operated means renders said biasing means effective or ineffective to subject said supply valve to said biasing force acting in a valve-closing direction, (b) a removable stop member carried by said cup-shaped piston member adjacent its open end, (c) an exhaust valve element carrying thereon said exhaust valve and slidably mounted in said cup-shaped piston member on one side of said stop member, and (d) a second biasing means stronger than said first-mentioned biasing means and so interposed between said cup-shaped piston member and said exhaust valve element as to normally bias said exhaust valve element against said one side of said stop member, the strength of said second biasing means being such as to enable shifting of said cup-shaped piston member carrying thereon said supply valve in a valve closing direction relative to said exhaust valve element cojointly by the force of said first-mentioned biasing means and the pressure of the fluid supplied to said braking means only upon the pressure of said fluid reaching the value attained upon effecting a full service brake application.

10. A fluid pressure controlled vehicle brake apparatus, as recited in claim 8, further characterized in that said valve means further comprises:

(a) a cup-shaped piston element, and (b) a cup-shaped piston member carrying said supply valve so slidably mounted in said cup-shaped piston element as to in cooperation therewith form a chamber in which said biasing means is so disposed as to be interposed between said piston element and said piston member so that said biasing means is effective to subject said supply valve to a force acting in a valve-closing direction, and said means for subjecting said supply valve to the fluid under pressure supplied to said braking means comprises:

(c) conduit means through which the fluid under pressure supplied to said braking means is supplied to said chamber whereby said fluid under pressure supplied to said chamber establishes a fluid pressure force that acts on said piston member cojointly with said biasing means to effect shifting of said piston member in the direction to move said supply valve carried thereby to its valve-closed position.

11. A fluid pressure controlled vehicle brake apparatus, as recited in claim 8, further characterized in that said means for subjecting said supply valve to the fluid under pressure supplied to said braking means comprises:
(a) a valve seat for said supply valve,
(b) a valve seat for said exhaust valve, and
(c) conduit means so arranged with respect to said valve seats that, while said exhaust valve is seated on its seat and said supply valve is unseated from its seat, the fluid under pressure supplied by said supply valve past its seat, while unseated therefrom, is supplied to said supply valve to effect, in cooperation with said biasing means the shifting of said supply valve relative to said exhaust valve and its seat to said valve-closed position in which said supply valve is seated on its valve seat to cut off flow of fluid under pressure to said braking means without effecting shifting of said exahust valve and its seat.

12. A fluid pressure controlled vehicle brake apparatus, as recited in claim 8, further characterized by means for selelctively varying the force of said biasing means.

13. A fluid pressure controlled vehicle brake apparatus, as recited in claim 8, further characterized by manually adjustable means for varying the force of said biasing means.

14. A fluid pressure controlled vehicle brake apparatus, as recited in claim 13, further characterized by locking means for locking and unlocking said manually adjustable means.

15. A fluid pressure controlled vehicle brake apparatus, as claimed in claim 8, further characterized in that said selectively positionable means includes a check valve that, while said means is in its said one position, enables one-way flow of fluid under pressure from said brake pipe to said second reservoir.

16. A fluid pressure controlled vehicle brake apparatus, as recited in claim 8, further characterized in that said selectively positionable means includes a check valve that, while said means is in its said other position, enables one-way flow of fluid under pressure from said bake pipe to said auxiliary reservoir.

17. A fluid pressure controlled vehicle brake apparatus, as recited in claim 16, further characterized by biasing means for biasing said check valve in the direction to prevent flow of fluid under pressure from said brake pipe to said second reservoir until the pressure in said brake pipe exceeds a chosen value.

18. A fluid pressure controlled vehicle brake apparatus, as recited in claim 8, further characterized in that said fluid pressure operated valve means is operatively responsive to the release of all fluid under pressure from said brake pipe to also establish a communication between said second reservoir and said auxiliary reservoir to enable the supply of fluid under pressure from both of said reservoirs to said fluid pressure operated braking means.

19. A fluid pressure controlled vehicle brake apparatus, as recited in claim 18, further characterized by biasing means for biasing said check valve in the direction to prevent flow from said brake pipe to said auxiliary reservoir until the pressure in said brake pipe exceeds a chosen value.

20. A fluid pressure controlled vehicle brake apparatus, as recited in claim 8, further characterized in that said fluid pressure operated brake control valve device includes a quick service valve means for supplying fluid under pressure from said brake pipe to said fluid pressure operated braking means in response to a reduction of brake pipe pressure on said one side of said first movable abutment.

21. A fluid pressure controlled vehicle brake apparatus, as recited in claim 8, further characterized in that said fluid pressure operated brake control valve device includes a quick service valve means for supplying fluid under pressure from said brake pipe to said fluid pressure operated braking means in response to a reduction of brake pipe pressure on said one side of said first movable abutment, and by valve means for cutting off said supply of fluid under pressure from said brake pipe to said fluid pressure operated braking means upon the pressure in said braking means reaching a chosen value.

22. A fluid pressure controlled vehicle brake apparatus, as recited in claim 21, further characterized in that said quick service valve means comprises a spool-type valve disposed between said stem and said first movable abutment and constituting an operable connection therebetween whereby said first movable abutment is enabled to effect movement of said stem in said one direction.

23. A fluid pressure controlled vehicle brake apparatus, as recited in claim 8, further characterized in that said selectively positionable means comprises a valve cover member having thereon a flat face at which opens the ends of each of a plurality of passageways in said cover, and therein a plurality of check valves each enabling one-way flow through one of said plurality of passageways.

24. A fluid pressure controlled vehicle brake apparatus, as recited in claim 23, further characterized by a one-way flow valve means providing flow of fluid under pressure from said cut-off valve means to said fluid pressure operated braking means to prevent loss of fluid under pressure supplied to said braking means by said fluid pressure operated brake control service valve device should said cut-off valve means become so damaged as to open a communication from said one-way flow valve means to atmosphere.

25. A fluid pressure controlled vehicle brake apparatus, as recited in claim 8, further characterized in that said lost-motion connection between said supply valve and said exhaust valve is so constructed and arranged with respect to said stem whereby said supply valve and said exhaust valve are so coaxially arranged that, while said supply valve is open and said exhaust valve is closed by said stem, the fluid under pressure supplied to said braking means acts on one end of said supply valve over an area that is larger than the area of the opposite end of said supply valve subject to said fluid under pressure supplied to said braking means thereby enabling the establishment of a first differential fluid pressure force on said supply valve that is effective cojointly with said biasing means to close said supply valve prior to the fluid under pressure supplied to said braking means and said one side of the second movable abutment establishing on said second movable abutment a second differential fluid pressure force that acts in a direction opposite to and is substantially equal to the differential fluid pressure force established on said first movable abutment in response to said reduction in brake pipe pressure on said one side of said first movable abutment whereby said first differential fluid pressure force acting conjointly with said biasing means on said supply valve is effective to limit the pressure obtained in said braking means.

26. A fluid pressure controlled vehicle brake apparatus, as recited in claim 25, further characterized in that said lost-motion connection between said supply valve and said exhaust valve comprises:
   (a) a cup-shaped member provided with an annular groove forme in the wall thereof and carrying thereon at its open and said supply valve,
   (b) a snap ring disposed in said annular groove in said cup-shaped member,
   (c) an exhaust valve element carrying thereon at one end said exhaust valve element and having intermediate its ends an out-turned flange, said exhaust valve element being so disposed in said cup-shaped member between the closed end thereof and said snap ring that said out-turned flange and said snap ring so cooperate that said supply valve and said exhaust valve are each shiftable with respect to the other, and
   (d) a spring interposed between the closed end of said cup-shaped member and the other end of said exhaust valve element and normally effective to bias said out-turned flange against said snap ring, the strength of said spring being in excess of the strength of said biasing means to enable closing of said exhaust valve and thereafter opening of said supply valve by said stem without effecting shifting of said exhaust valve element and said exhaust valve carried thereby with respect to said cup-shaped member and said supply valve carried thereby whereby said supply valve is closed in response to the sum of the force of said biasing and said differential fluid pressure force acting thereon independently of the pressure of the fluid in said braking means and on said one side of said second abutment, thereby enabling limiting the pressure obtained in said braking means in accordance with the strength of said biasing means.

27. A fluid pressure controlled vehicle brake apparatus, as recited in claim 26, further characterized by sealing means carried by said exhaust valve element and forming a seal with said cup-shaped member thereby enabling the area of the closed end of said piston member that is subject to the pressure of the fluid supplied to said braking means to exceed the area of the other end of said cup-shaped member that is subject to the fluid supplied to said braking means thereby enabling the establishment of a differential fluid pressure force on said cup-shaped member.

28. A fluid pressure controlled vehicle brake apparatus, as recited in claim 8, further characterized in that said fluid pressure operated valve means comprises:
   (a) a spool-type valve having a first position for establishing a first communication between said auxiliary reservoir and said second reservoir and a second communication between the other side of said fluid pressure operated abutment means and atmosphere and a second position closing said first and second communications and establishing a third communication between said fluid pressure operated braking means and said other side of said fluid pressure operated abutment means,
   (b) biasing means for biasing said spool-type valve to its said first position, and
   (c) abutment means operable by fluid under pressure from said brake pipe to shift said spool-type valve from its first position to its second position against the yielding resistance of said biasing means.

29. A fluid pressure controlled vehicle brake apparatus, as recited in claim 28, further characterized in that biasing means comprises a spring, and by means for selectively varying the strength of said spring.

30. A fluid pressure controlled vehicle brake apparatus, as recited in claim 28, further characterized in that said biasing means comprises a spring, and by manually adjustable means for varying the strength of said spring.

31. A fluid pressure controlled vehicle brake apparatus, as recited in claim 8, further characterized in that said fluid pressure operated abutment means comprises:
   (a) a cup-shaped piston element provided with an annular groove formed in the wall thereof and having said supply valve and said biasing means so disposed therein that said biasing means is interposed between said piston element and said supply valve, and
   (b) a snap ring disposed in said annular groove in said piston element, and said biasing means comprises:
   (c) a spring,
   (d) a pair of spring seats for said spring, one of said spring seats being so arranged as to normally abut said supply valve thereby transmitting the biasing force of said spring to said supply valve, said one spring seat being so disposed with respect to said snap ring that shifting of said cup-shaped piston element in response to the supply of fluid under pressure to only said one side thereof enables said snap ring carried thereby to engage said one spring seat and thereafter shift said one spring seat out of abutting relationship with said supply valve thereby rendering said spring ineffective to transmit force to said supply valve.

32. A fluid pressure controlled vehicle brake apparatus, as recited in claim 31, further characterized by sealing means carried by said cup-shaped piston element to prevent flow of fluid under pressure from said one side to said other side while said other side is subject to atmospheric pressure.

33. A fluid pressure controlled vehicle brake apparatus, as recited in claim 31, further characterized by means for effecting shifting of the other of said pair of spring seats to vary the force transmitted by said spring to said supply valve.

34. A fluid pressure controlled vehicle brake apparatus, as recited in claim 31, further characterized by manually operable means for effecting shifting the other of said pair of spring seats to vary the force transmitted by said spring to said supply valve.

35. A fluid pressure controlled vehicle brake apparatus, as recited in claim 8, further characterized in that said means for simultaneously subjecting said one side of said fluid pressure operated abutment means and said supply valve to the fluid under pressure supplied by said supply valve to said fluid pressure operated braking means comprises a conduit means having one end thereof so disposed as to receive fluid under pressure supplied to said fluid pressure operated braking means by said supply valve and the other end so disposed that fluid under pressure discharged therefrom is effective to transmit a first fluid pressure force that acts in said valve closing direction on said supply valve and a second fluid pressure force that acts in an opposite direction on said one side of said fluid pressure operated abutment means whereby, in the absence of the supply of fluid under pressure to the other side of said abutment means, it is effective to render said biasing means ineffective to subject said supply valve to the biasing force thereof so that the closing of said supply valve is effected solely in response to the pressure of the fluid supplied to said braking means thereby enabling a buildup of a higher pressure in said braking means prior to closing of said supply valve than when both sides of said fluid pressure operated abutment means are subject to the pressure in said braking means.

* * * * *